United States Patent
Muqaibel et al.

(10) Patent No.: US 8,804,811 B2
(45) Date of Patent: Aug. 12, 2014

(54) METHOD FOR COMPRESSIVE SENSING, RECONSTRUCTION, AND ESTIMATION OF ULTRA-WIDEBAND CHANNELS

(71) Applicant: King Fahd University of Petroleum and Minerals, Dhahran (SA)

(72) Inventors: Ali Hussein Muqaibel, Dhahran (SA); Mohammad Tamim Alkhodary, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 85 days.

(21) Appl. No.: 13/681,340

(22) Filed: Nov. 19, 2012

(65) Prior Publication Data

US 2014/0140375 A1     May 22, 2014

(51) Int. Cl.
*H03K 7/00* (2006.01)
(52) U.S. Cl.
USPC .......................................................... 375/239
(58) Field of Classification Search
CPC ............ H04B 1/7163; H04B 1/71632; H04B 1/71635; H04B 1/717; H04B 1/7172; H04B 1/7174
USPC .................. 375/130, 237, 238, 239
See application file for complete search history.

(56) References Cited

U.S. PATENT DOCUMENTS

| | | |
|---|---|---|
| 2009/0222226 A1 | 9/2009 | Baraniuk et al. |
| 2011/0122930 A1 | 5/2011 | Al-Naffouri et al. |
| 2012/0150493 A1 | 6/2012 | Casey et al. |
| 2013/0069807 A1* | 3/2013 | Sestok et al. .................. 341/110 |

OTHER PUBLICATIONS

E. Lagunas and M. Najar, "Sparse Channel Estimation based on Compressed Sensing for Ultra WideBand Systems" IEEE International Conference on Ultra-Wideband (ICUWB), 2011, pp. 395-399, Apr. 2011.

* cited by examiner

*Primary Examiner* — Kevin Kim
(74) *Attorney, Agent, or Firm* — Richard C. Litman

(57) ABSTRACT

The method for compressive sensing (CS) and reconstruction of ultra-wideband (UWB) channels includes building four practically-based dictionaries related to the antenna angles of transmission and angles of arrival that enhance the sparsity of UWB signals. The dictionaries account for the practical effects of the channel, such as pulse dispersion and the unavoidable effects of the antenna. Utilizing the practically-based dictionaries CS is able to reconstruct the UWB signals more efficiently with reasonable complexity. In addition to waveform reconstruction, the dictionaries are used for channel estimation. The CS method can be used with either a single-shot full profile correlator or a Rake receiver. The Rake receiver employs CS in adjusting its parameters to take advantage of the energy available in the strongest propagation paths.

18 Claims, 29 Drawing Sheets

METHOD FOR COMPRESSIVE SENSING, RECONSTRUCTION, AND ESTIMATION OF ULTRA-WIDEBAND CHANNELS

BACKGROUND OF THE INVENTION

1. Field of the Invention

The present invention relates to Ultra-Wideband Radio (UWB), and particularly to a method for compressive sensing, reconstruction, and estimation of ultra-wideband channels utilizing antenna angle dictionaries for increasing sparsity of UWB signals to facilitate reconstruction and estimation of ultra-wideband channels.

2. Description of the Related Art

There are two prominent types of UWB signals: "Impulse Radio Ultra-Wideband" (IR-UWB) and "Multicarrier Ultra wideband" (MC-UWB). The former is based on sending very short duration pulses, in order of nanoseconds, to convey information. The latter uses multiple simultaneous carriers to carry information. Each type has its relative technical pros and cons and spectrum occupancy requirements. IR-UWB is discussed herein.

IR-UWB, with its huge advantages, has been recognized as a great solution for future wireless personal networks. IR-UWB technique has the possibility of achieving Gigabits/s data rates, hundreds of meter operation range, Pico joule energy per bit, centimeter accuracy of positioning, and low-cost implementation. It also offers great flexibility of spectrum usage and allows unlicensed usage of several gigahertz of spectrum.

Unlike classical communications, in IR-UWB, no up-and-down radio frequency conversion is required; which reduces the implementation cost, and allows low power transmitter implementation.

The basic model for an unmodulated IR-UWB pulse train can be expressed as:

$$s(t) = \sum_{i=-\infty}^{\infty} A_i(t) p(t - iT_f) \quad (1)$$

where $A_i(t) = \pm\sqrt{E_p}$ is the amplitude of the pulse with energy of $E_p$, $p(t)$ is the normalized pulse waveform, and $T_f$ is the frame time that is defined as the time interval in which one pulse is transmitted.

The UWB pulse waveform can be any pulse that satisfies the spectral mask1 regulatory requirements. The common pulse shapes discussed in IR-UWB literature are the Gaussian pulse and its derivatives. The reason for this name is referred to the similarity with Gaussian function that can be represented as:

$$p(t) = \frac{1}{\sqrt{2\pi\sigma^2}} e^{\frac{(t-\mu)^2}{2\sigma^2}} \quad (2)$$

where $\sigma$ is the standard deviation of the Gaussian pulse in seconds, and $\mu$ is the delay in time for the midpoint of the Gaussian pulse in seconds. The pulse width is denoted by $\tau_p$, which is a function of the standard deviation, given as $\tau_p = 2\pi\sigma$. The nominal center frequency and the spectrum bandwidth depend upon the pulse width. The bandwidth is approximately equal to 116% of $1/\tau_p$.

UWB receivers face several challenges, including narrowband interference cancellation, antenna design, timing synchronization, and channel estimation, among others. The extremely high bandwidth of the received IR-UWB signal (up to 7.5 GHz) requires high-speed analog-to-digital converters. For such speed, the use of ADC (Analog-to-Digital Conversion) increases, and likewise demands an accurate timing control system.

The conventional approach of sampling, however, consumes a lot of power, gives relatively low resolution, and can be expensive. Because it requires precise timing control system, the complexity of the circuitry increases. Moreover, oversampling of the received UWB signal may be required to improve the timing synchronization and channel estimation. For example, in many prior art methods, the required sampling rate is in excess of 25 GHz for an accurate UWB channel estimation. Such huge sampling rates are not easily supported by the current ADC technology. Consequently, alternative approaches for UWB receivers are needed to attain the required sampling rates and the time resolution. Many of these challenges can be reduced or mitigated by means of compressive sensing (CS) and its features. Yet, there remains the problem of optimizing CS to achieve the best possible channel sampling/estimation rates.

Thus, a method for compressive sensing, reconstruction, and estimation of ultra-wideband channels solving the aforementioned problems is desired.

SUMMARY OF THE INVENTION

The method for compressive sensing (CS), reconstruction, and estimation of ultra-wideband channels includes building four practically based dictionaries related to the antenna angles of transmission and angles of arrival that enhance the sparsity of UWB signals. The dictionaries account for the practical effects of the channel, such as pulse dispersion and the unavoidable effects of the antenna. Utilizing the practically based dictionaries, CS is able to reconstruct the UWB signals more efficiently and with reasonable complexity. In addition to waveform reconstruction, the dictionaries proposed in the present method may be used for channel estimation. The CS method can be used with either a single-shot full profile correlator or a Rake receiver. The Rake receiver employs CS in adjusting its parameters to take advantage of the energy available in the strongest propagation paths.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
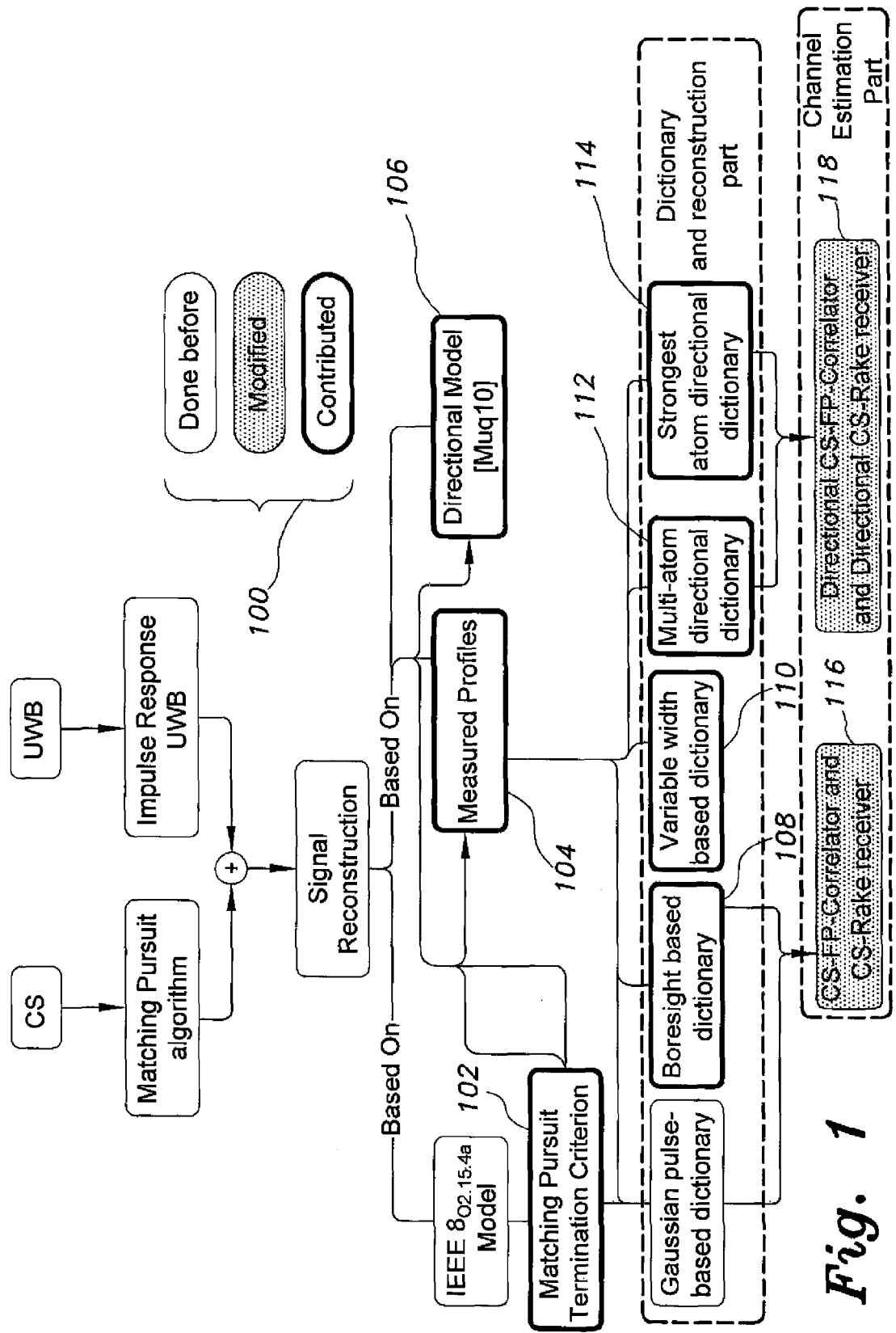
FIG. 1 is a block diagram showing the procedural components of a method for compressive sensing, reconstruction, and estimation of ultra-wideband channels according to the present invention.

As shown in the block diagram of FIG. 1, the method for compressive sensing (CS), reconstruction and estimation of ultra-wideband channels includes building four practically based dictionaries related to the antenna angles of transmission and angles of arrival that enhance the sparsity of UWB signals. The legend 100 shows the novel approaches used in the present method vs. procedures already known in the art. As shown in FIG. 1, these novel dictionaries include a boresight-based dictionary 108, a variable width-based dictionary 110, a multi-atom directional dictionary 112, and a strongest atom directional dictionary 114. The dictionaries account for the practical effects of the channel, such as pulse dispersion and the unavoidable effects of antenna. A matching pursuit (MP) algorithm 200 (shown in FIG. 2), having a novel termination criterion 102 and measured profiles 104, and a directional model 106 are used in the formulation of the aforementioned dictionaries. Utilizing the practically based dictionaries, CS is able to reconstruct the UWB signals more efficiently with reasonable complexity. In addition to waveform reconstruction, the dictionaries are used for channel estimation, incorporated into a modified CS-FP correlator and CS rake receiver 116, while specifically, the strongest atom directional dictionary 114 is used in a directional CS-FP-correlator and directional CS rake receiver 118. Recalling the ultra-short pulse characterization of equation (2), consider a discrete signal X of one-dimensional real values and finite length, which can be represented as a column vector of dimensions N×1 in $\mathbb{R}^N$. In addition, consider an N×N matrix $\Psi$ that consists of a basis vectors of dimensions N×1 as $\{\psi_n\}_{n=1}^N$.

Thus, $\psi_n = [\psi'_1, \psi'_1 \ldots, \psi'_N]$ where any signal in $\mathbb{R}^N$ can be represented in terms of these vectors. Therefore, the signal can be expressed as:

$$X = \sum_{n=1}^{N} \theta_n \psi_n = \Psi \Theta \quad (3)$$

The vector $\Theta = [\theta_1, \theta_2, \ldots, \theta_N]^T$ is an N×1 column vector consisting of the weighting coefficients of the signal X in the basis matrix $\Psi$. Accordingly, X is the representation of the signal in the time domain, while $\theta_n$ is the representation of the signal in the $\Psi$ domain.

Assume the signal X is a linear combination of only S basis vectors in $\Psi$. This means that only S elements of the coefficients vector $\Theta$ are non-zero, and the rest of the N−S elements are zeros. Therefore, the signal is called S sparse.

CS senses, i.e., "measures", the signal by projecting what is called a measurements matrix on the received signal. Mathematically, this means taking the inner products between X and a collection of vectors $\{\phi_m\}_{m=1}^M$, as in $y_m = <X, \phi_m>$, to have measurements vector y of length M×1. To be more specific, the M×N measurements matrix contains the measurement vectors as rows, and y can be expressed by projecting X on the matrix $\Phi$ as:

$$y = \Phi X = \Phi \Psi \Theta \quad (4)$$

Note that $X=\Phi\Psi$, which is an M×N matrix. In order to have reliable results out of CS algorithms, the basis matrix $\Psi$ and the matrix $\Phi$ have to be incoherent, as proved by CS theories.

The original sparse coefficients can be exactly recovered from the measurement vector y by minimizing the $l_1$-norm given in the following optimization problem:

$$\hat{\Theta}=\text{argmin}\|\Theta\|_1 \text{ such that } \Phi\Psi\Theta=y \qquad (5)$$

where $\hat{\Theta}$ is the recovered vector of S sparse coefficients. In other words, among all consistent solutions, we pick the solution whose coefficient has the minimal $l_1$-norm.

The convex optimization problem in equation (5), based on minimizing $l_1$ subject to linear equality constraints, can easily be reformed as a linear program with more efficient solution algorithms. The underlying result of CS asserts that when $\theta$ is sufficiently sparse; the recovery via $l_1$-minimization is provably exact. In fact, the use of the $l_1$-norm as a sparsity-promoting function traces back several decades. However, $l_1$-minimization is not the only way to recover sparse solutions. Other methods, such as greedy algorithms, have also been proposed.

Solving the optimization problem in equation (5) by means of $l_1$-minimization, which can be done by Basis Pursuit (BP), is computationally expensive and is not suitable for state-of-the-art of CS technology. Available faster and more efficient reconstruction algorithms use iterative greedy-based algorithms at the expense of slightly more measurements. The most popular of these algorithms are matching pursuit, orthogonal matching pursuit, and tree-based matching pursuit among others.

BP employs linear programming and offers good performance, but suffers from high computational complexity. MP provides a low-complexity alternative to BP, but requires an unbounded number of iterations for convergence. OMP converges in a fixed number of iterations, but requires the added complexity of dictionary orthogonalization at each step. These algorithms for reconstruction are generic, in the sense that they do not exploit any structure (aside from sparsity) that may exist in the sensed signals.

Figure 2:
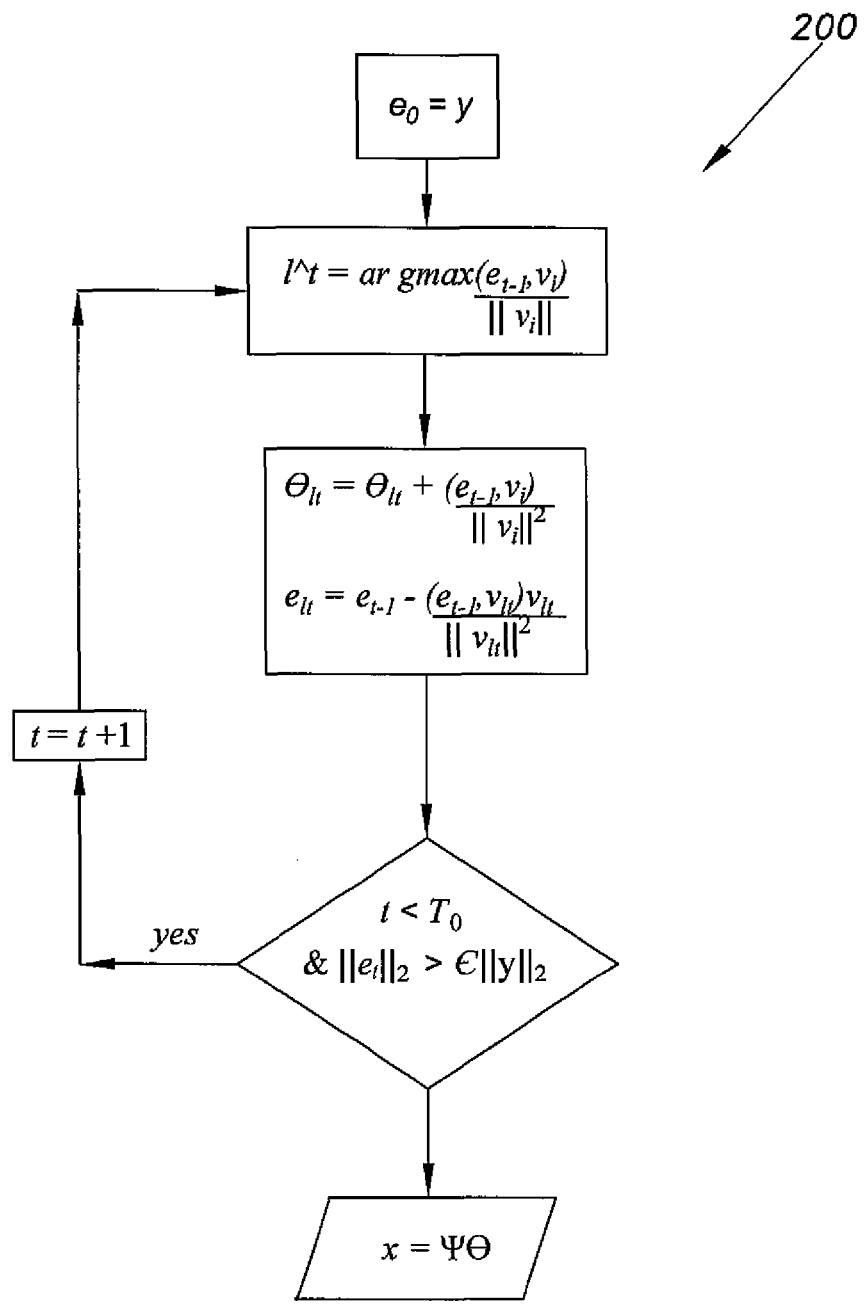
FIG. 2 is a flowchart showing the matching pursuit algorithm used in a method for compressive sensing, reconstruction, and estimation of ultra-wideband channels.

In particular, the MP algorithm is a computationally simple iterative greedy algorithm that tries to recover the signal by finding the strongest component ($\psi_n$), which is defined as an atom (i.e., the basis element that composes the signal in the sparsity dictionary), in the measurement vector (y). This strongest component will be removed from the measurement vector, and the corresponding atom is copied to a new, clean dictionary. Then, search again in the dictionary for the strongest atom that is left in the residual of the measurement vector. This procedure is iteratively repeated until the residual of y contains just insignificant information. Signal reconstruction is then accomplished by linearly combining the set of atoms of the clean dictionary (the atoms found in the sparsity dictionary). The flowchart in FIG. 2 shows in detail the steps of the MP algorithm 200, where the conditional diamond controls the iterations of the algorithm by two parameters: $T_0$, which determines the maximum number of iterations; and $\epsilon$, which sets the minimum energy that is left in the residual signal.

The present method focuses mainly on the behavior of CS in practical UWB channels under the effects of pulse dispersion and shape corruption. The accuracy of reconstruction, by means of the MP algorithm, is proportional to computation efforts, depending upon a couple of parameters of the MP algorithm. Based on the IEEE 802.15.4a model of the UWB channel, the values of these parameters have been examined and optimized to keep the balance between the quality of reconstruction and computation complexity. MP is used to aid in managing the behavior of CS in practical UWB channels under the effects of pulse dispersion and shape corruption.

Realistic received UWB signals have various pulse shapes due to the physical effects of the realistic channel and the antenna's radiation pattern. Since CS performance relies on the fact that the desired signal has to be sparse in a certain domain "dictionary", the present method implements and evaluates the performance of the Matching Pursuit algorithm in reconstructing practical profiles. The degradation in performance is further mitigated by the design of a dictionary based on the practical received signal at the boresight (zero degrees to the transmitter antenna); the design of a dictionary out of atoms of variable pulse width in order to compensate for the pulse dispersion for the later arrivals; the design of a multi-atom directional dictionary, i.e., a directional dictionary from practical templates taken at different angles; and the design of a strongest atom directional dictionary, i.e., a directional dictionary based on the atoms of the strongest contribution taken from the previous directional dictionary.

For evaluation of the above signal reconstruction in channel estimation and in a full estimation system, the present method implements the above CS based on a directional dictionary in a full profile correlator receiver and in a Rake receiver (multi-correlator).

The performance of the Matching Pursuit algorithm has been evaluated in the reconstruction of practical measured UWB signals and signals based on the present method's directional model (more practical model). Moreover, the present method utilizes parameters based on the impact of the increment of MP iteration on reconstruction accuracy.

Additionally, the present method utilizes a redesigned sparse dictionary, which accounts for the pulse dispersion and pulse shape change due to antenna dependence. The shape of the (reference template) is considered in the channel estimation stage of the Rake receiver and the CS-FP Correlator. The performance of the present modified CS method over a full UWB communications with channel estimation is considered.

The reconstruction of the UWB signals is based on time sparsity. To improve the ability of CS reconstruction, one has to increase the number of random measurements. As is known by those having ordinary skill in the art, similar conclusions hold true in general for any kind of signals. The present method contemplates reducing this requirement for more sampling rate, thereby reducing the demand for additional ADC (analog-to-digital converter) resources.

An exemplary reconstruction based on multipath diversity follows. Transmitting ultra-short pulses results in less overlapping between the pulses. This is because the duration of the pulse is usually shorter than the inter-travel time between the paths. In other words, UWB channels, in general, are rich in multipath diversity, offering, in turn, higher energy compaction, sparseness, and thus higher probability of exact reconstruction via CS. Reliance is made on the fact that received IR-UWB signals can be thought of as a linear combination of the signal contributions of the various propagation paths that compose the UWB multipath channel. These paths reflect different versions of the transmitted signal. CS theory has more reliable outcomes, as the underlying signal has more sparsity in some domains. Thus, defining a suitable dictionary to represent the underlying IR-UWB signal is essentially important. By examining the characteristics of the IR-UWB received signal, we can figure out a simple way to generate a dictionary, where the transmitted pulse is used as a basis atom that provides a better sparse representation of the received IR-UWB signals. The received IR-UWB signal is formed by scaled and shifted versions of the transmitted pulse, and since the dictionary has to contain all basis (atoms) that could provide the best representation of the received IR-UWB signal, it is logical to think that the basic function to generate the atoms of the dictionary should be replicas of the pulse waveform used to carry information, which, in our case, is the first derivative of the Gaussian pulse. Going into details, the dictionary is generated by shifting the transmitted pulse, p(t), with a minimum step of $\Delta$, leading to a set of parameterized waveforms specified by:

$$\psi_j = p(t - j\Delta) = p(t - j\Delta)e^{-\frac{(t-j\Delta)2}{2\sigma^2}} \quad (6)$$
$$j = 0, 1, 2, \ldots$$

This, in turn, defines the dictionary of sparsity, $\Psi$ as:

$$\Psi = \{\psi_0(t), \psi_1(t), \ldots\}. \quad (7)$$

The atoms in the dictionary are delayed versions of the UWB transmitted pulse. The minimum step is dedicated to resolve or alleviate the overlapping between the arrived pulses, especially within clusters. By setting $\Delta$ greater than the width of the basic pulse, atoms in equation (6) become orthogonal to each other. Despite the fact that the orthogonal property is a desirable characteristic of a basis to guarantee unique representation of the signal, the rich multipath diversity introduced by the UWB channel produces pulse spread that is better captured by a redundant dictionary. Thus, $\Delta$ is set such that overlapping between atoms occurs.

Although equation (6) is expressed in terms of continuous time, t and $\Delta$, in practice both are discretized. By setting $\Delta$ to be a multiple of the sampling frequency, the dictionary becomes a complete and redundant dictionary. At this point we are ready to use the designed dictionary in our reconstruction problem. We re-express the received UWB signal by a discrete time vector as:

$$r_x = [r_x(0), r_x(t_S), \ldots, r_x((N-1)t_S)]^T, \quad (8)$$

Thus, we can write the measurement vector in a discrete representation as:

$$y = \Phi r_x \quad (9)$$

where $\Phi$ is the M×N measurement matrix of elements taken from normal distribution i.e., $\Phi_{ij} \sim (0,1)$. Finally, the resultant vector out of random projected signal, y, and the new sparse dictionary, $\Psi$, which is the uniformly sampled version of the dictionary, are passed as parameters to the MP algorithm. The outcome is a vector, $:\Theta$, of sparse coefficients that represents the contribution of the atoms in the dictionary. The reconstructed signal is eventually obtained by:

$$r_x = \psi\Theta = \Sigma_{n=1}^{N} \theta_n \psi_n, \quad (10)$$

where $\theta_n$ is the contribution amount of the atom $\psi_n$ in the dictionary $\psi$.

We sampled the projected signal by 10 GHz to obtain 1000 random measurements in order to reconstruct the test signal, which resulted in a normalized error of 0.014 and MSE of $6.52 \times 10^{-7}$. The lower sampling rate test signals had slightly more error as a consequence of fewer measurements. The recovered signal obtained by sampling the projected signal using a sampling frequency of 5 GHz resulted in an MSE of $26.6 \times 10^{-7}$ and a normalized error of 0.029. Specious recovered elements appeared when the sampling frequency was reduced to 2.5 GHz, consequently increasing the MSE to $403 \times 10^{-7}$ and the normalized error to 0.116.

With the aim of comparing the performance of CS in time sparsity assumption and the multipath diversity dictionary, from error statistics, it can be deduced that UWB signal reconstruction using multipath diversity outperforms reconstruction using a time sparsity assumption, the multipath diversity reconstruction technique yielding a reconstruction error that is more than 20-fold smaller.

Since the NLOS signals have less sparseness due to distraction and scattering, it is important to examine the performance of MP to reconstruct the NLOS propagation signal with an assumption of sparsity in the pre-designed dictionary.

The sparsity in the time domain assumption becomes worse or invalid for the case of NLOS propagation scenario. For example, an NLOS IR-UWB signal is clearly less sparse than an LOS signal under the same sparsity in the time domain assumption. When we try to reconstruct a NLOS signal that has a time resolution of 20 psec and similar indoor environment at 10 GHz, we end up with a normalized error of 0.578 and an MSE of $15 \times 10^{-4}$, which is more than what we get for the LOS case.

The approach to design of the dictionary used in this invention is based on the fact that the received IR-UWB signal in the following equation (11) is a linear combination of the signal contribution of the various propagation paths:

$$r_x(t) = p(t) * h(t) = \Sigma_{k=0}^{K-1} \Sigma_{l=0}^{L-1} \alpha_{k,l} p(t - T_l - \tau_{k,l}). \quad (11)$$

MP is efficiently able to reconstruct not only an LOS UWB signal, but it goes beyond that to much less sparse signals, for example, an NLOS signal, and the same holds true for other scenarios.

By using the dictionary defined in equation (8) and sampling the projected signal by 10 GHz, the reconstructed signal was found to have a normalized error of 0.046 and a MSE of $9.477 \times 10^{-6}$. Therefore, by building a dictionary that contains the basis functions of the desirable signal; a remarkable improvement in performance can be achieved. In addition, by having only two percent of the original samples, CS can reconstruct all signal components carrying a significant amount of energy in the received UWB signal.

So far, we have demonstrated that if we sample the IR-UWB received signal at a notably reduced sampling rate by means of CS, it is possible to recover the signal with a very small error. This, in turn, leads to a reduced use of ADC resources and improves the signal detection, as will be described subsequently.

Before getting further into the performance of CS on UWB signals, it is important to take the complexity of the MP algorithm into consideration and try to reduce it as much as possible. The MP algorithm has been proven to achieve an accurate outcome of signal reconstruction as a linear combination of the dictionary atoms. For a general dictionary, as is generally known, the complexity is approximately calculated by O(NM) for each iteration, where M is the number of measurements and N is the number of the signal samples. Since the required number of iterations is unbounded, the complexity of MP is also unbounded. As a matter of fact, the complexity of the MP algorithm is dominated by three factors: the number of measurements, M; the number of samples in the signal N; and the termination parameters (T and $\epsilon$). Those termination parameters would break the algorithm loop, as shown in the matching pursuit (MP) algorithm 200 of FIG. 2.

Many factors play a role when deciding suitable values for T and $\epsilon$, such as the dictionary of sparsity, the number of measurements, and incoherency. Experimental investigation was carried out to determine suitable values for the maximum number of iterations T to achieve a small and acceptable amount of residual error.

The relationship obtained by modifying the MP algorithm, shown in FIG. 2, via eliminating the termination condition ($\|e_r\|_2 > \epsilon \|y\|_2$), keeps the algorithm running until the maximum number of iterations is reached. This determines the minimum residual error that could be achieved by a certain number of iterations. The modified MP algorithm is used to recover 100 UWB signals by 100 trails, where in each trail, a different random measurement matrix Φ generated. The residual ratio, $$= \frac{\|e_r\|_2}{\|y\|_2},$$

is averaged over all signals and trails. The number of the signal samples, N, and the number of measurements were kept fixed. The residual ratio, $\epsilon$, lessens exponentially as the number of iterations increases.

We can deduce that after a certain residual ratio, increasing the number of iterations is essentially useless. Actually, it is harmful in terms of processing time and wasting power resources. Since the residual ratio will not change significantly in excess of 400 iterations, we will restrict the residual ratio, $\epsilon$, to 0.013.

The number of measurements or sampling frequency is a key factor when it comes to reconstruction accuracy. Even when sampled at a sub-Nyquist frequency, with CS reconstruction we are able to recover all frequencies involved in the signal, and not just the band below one-half the sampling frequency, as in the conventional approach of sampling.

The appropriate values of the MP algorithm parameters have been adjusted. T is set to 400 iterations, and the residual ratio, $\epsilon$, to 0.013. We examine how the number of measurements affects the reconstruction capability of the MP algorithm with the pre-defined dictionary. We examine two different levels of sparsity by considering LOS and NLOS scenarios.

Since we are concentrating on the indoor environments, it is useful to examine how much the variety in sparsity between LOS and NLOS will affect the performance of CS. As expected, NLOS reconstruction requires a higher sampling rate than that required for the LOS scenario, as a consequence of more sparsity. Furthermore, there is still a small amount of error even in at a high sampling rate due to the randomness in measurements and other issues, like orthogonality of atoms in the sparsity dictionary. Nevertheless, these errors are negligible.

We also have demonstrated the ability of CS to reconstruct an IR-UWB signal generated by the IEEE 802.15.4a model, using time domain sparsity and a pre-designed dictionary. The predefined dictionary is based on the assumption that multipath components are delayed, and uses a scaled version of the transmitted pulse. This assumption was proved to be more efficient than the time sparsity assumption.

Analysis of wireless channels often means examining a huge bank of measured impulse responses and finding an appropriate statistical model. The UWB channel has a lot of characteristics associated with different impacts on the propagating signal. Attempting to apply narrowband models or a model with a limited number of parameters, like the IEEE 802.15.4a channel model, to design or evaluate UWB receivers can be misleading. To simulate a realistic UWB channel, one has to include the alteration of the transmitted pulse due to physical phenomena, such as reflections or diffractions, as well as the antenna's frequency-dependent response. For wideband systems, pulse distortion caused by RF components, pulse dispersion produced by the antenna, and time jitter generated by non-ideal oscillators cannot be ignored. These phenomena affect directly the performance of the overall communication system. In the case of narrowband communication systems, these transient temporal effects are only a small fraction of the symbol duration and may often be ignored.

In UWB signal reconstruction, transient effects, such as pulse dispersion, will reduce the validity of the assumption that the UWB signal is sparse in the multipath-based dictionary.

The analysis of indoor UWB channels based on simulation of the entire transmission link using statistical methods is useful in assessing system performance. This approach, however, requires extensive propagation measurements, and all factors have to be taken into consideration to be able to accurately evaluate the performance of the system in that practical environment. Some researchers of CS and UWB work on the IEEE statistical model, and others build their assumptions on the well-known Saleh and Valenzuela model, while still others consider the channel model of IEEE802.15.3a standard.

CS reconstruction was evaluated and the simulation was run based on the IEEE 804.15.4a channel model, assuming no frequency dependence. We extend the work to examine the performance of CS in the presence of physical effects, like the ones cause by the channel and the antenna. To the best of the inventors' knowledge, this extension was not done before.

Based on realistic UWB profiles, we validate sparsity in the time assumption. The transmitted pulse-based dictionary is then used in the MP algorithm to recover the practical profiles. The performance has some degradation due to the physical realistic effects that have not been considered. Alternative practical dictionaries are designed to increase the sparsity, and hence to improve the performance of the MP algorithm. The same approaches are applied to the directional UWB channel model. Since the reconstruction quality depends on the sampling frequency (among others), the signal reconstruction is evaluated using the proposed dictionaries versus sampling frequency, for both measured and directional model profiles.

To transmit an extremely short pulse, as in UWB systems, the antenna has to be uniquely designed and able to deal with the wide bandwidth. One of the challenges in the implementation of UWB systems is the development of a suitable antenna that would enhance the transmission performance. Since the usual data demodulation in UWB is based on the pulse shape, a clean impulse response (that has minimal pulse distortion) is a primary requirement for an efficient UWB antenna.

Although the antenna characteristics in the frequency domain are important, the response of a UWB antenna can be better described in terms of its temporal characteristics. The ideal UWB antenna (that has minimal pulse distortion) has to generate a radiation field having constant magnitude and phase shift that varies linearly with the frequency. Moreover, the radiation pattern should be spherical and have similar response at all directions. When these dual requirements are met, the radiated signal will be only a time derivative of the input signal.

Many antenna designs are proposed that have UWB bandwidths. Impulse and frequency response are evaluated, and the antenna that provides relatively flat frequency response over a broad band is chosen. Thus the present methods have been formulated using a transverse electromagnetic (TEM) horn antenna. Because it is quite broadband in receiving mode, both in magnitude and phase, the TEM horn is a perfect choice for impulsive free-space measurements. TEM horns have been traditionally used for low-dispersion launching and receiving of UWB pulses. Research conducted since the late 1970s has led to a further reduction of dispersion caused by the TEM horn abrupt edges, by loading with chip resistors or a conductive film as one solution to suppress the reflection from the TEM horn edges.

Radiated measurements are used to characterize the TEM antennas. The relation between the multipath angle and the pulse shape are also presented in the same source. Since the antenna pattern plays an important role for both the receiver and the transmitter, we briefly illustrate the effects of the angle of arrival on pulse shape using the TEM antenna. TEM antenna investigations exhibit that multipath components have different waveforms, regardless of the medium. In this regard, experiments have been done where the transmitter and the receiver antennas are positioned in a boresight direction. The transmit antenna is then kept fixed; and the receive antenna is rotated along the elevation angle at different angles, specifically to obtain the vertical measurement. Similarly, the horizontal measurements are taken, but by rotating the receiver antenna along the azimuth angle with the same previous elevation angles. Both the direct path and reflection from the floor was observed during experimentation with the antenna. Similar experimental results have previously been obtained. Accordingly, the realistic received UWB signals are composed of different pulse shapes corresponding to the different propagation paths. Thus, it is useful to design a dictionary based on the received pulse shapes.

The evaluation of the proposed modifications to reconstruct UWB signals using the MP algorithm will be validated against practical profiles. The sources of these practical profiles are either measured UWB signals and/or/profiles generated using the directional model, which account for the antenna effects.

Time-domain measurement profiles are provided and obtained using a sampling oscilloscope as receiver and a Gaussian pulse generator as transmitter. Two low-noise wideband amplifiers were used at the receiver side. The width of the transmitted pulse is 0.34 ns. The received signals were sampled at a rate of 1 sample per 20 ps.

An acquisition time window of 100 ns was selected to ensure that all observable multipath components are accounted for. The sampling rate leads to 5000 points, corresponding to the 100 ns time window. In indoor environments, the time-varying part of the impulse response is typically due to human movements.

By conducting the measurements during low activity periods and by keeping both the transmitter and the receiver stationary, the channel can be treated as being semi-stationary. This permitted averaging 32 measurements, thus effectively canceling out the noise. The measurements were performed using directional TEM horn antennas. Sparsity is a concern in measured profiles. For the measurements in hand, 63 profiles in the LOS propagation scenario are used.

Unlike the IEEE 802.15.4a model, where the received waveform is a summation of scaled and shifted versions of the transmitted pulse, the present inventor, Ali Hussein Muqaibel, has previously proposed a directional model where the received waveform is a summation of scaled, delayed, and modified pulse shapes. The difference in pulse shape is due to the antenna directional response. Hence, the relative angles between the transmitter and the receiver antennas have been included in the directional model.

Figure 18:
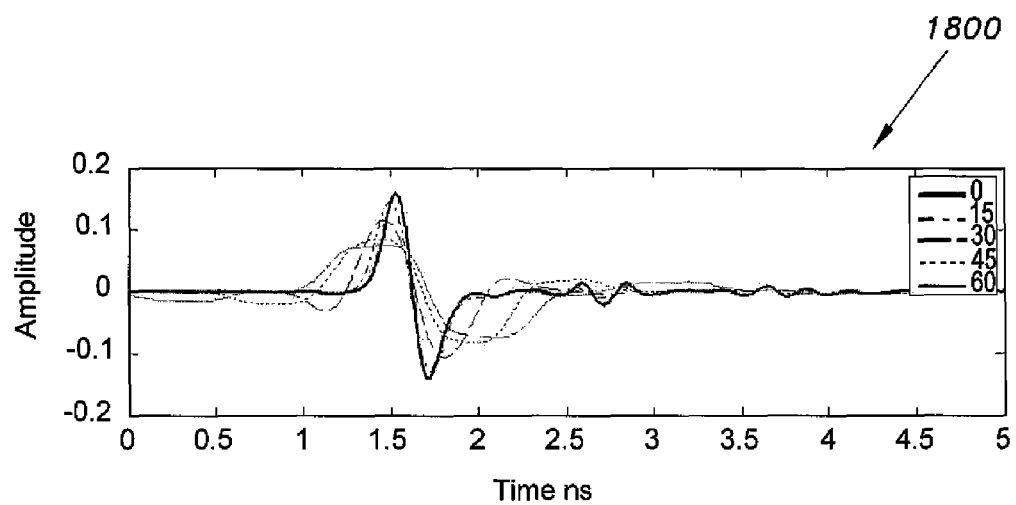
FIG. 18 shows simulated TEM waveforms at different angles.
Figure 19:
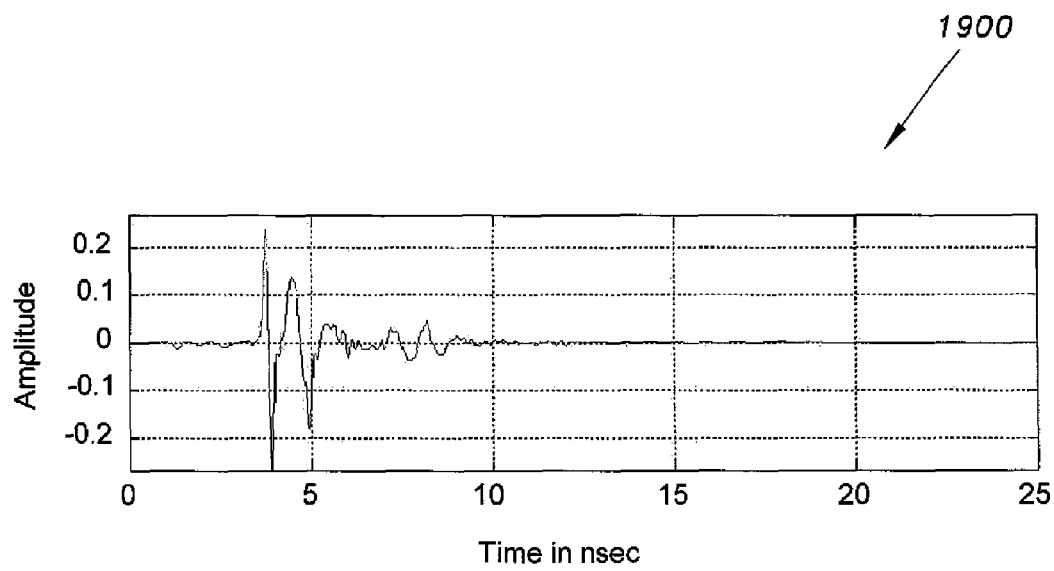
FIG. 19 shows a full directional UWB profile generated by a TEM antenna simulator.

The directional model assumes that the channel is composed of ideal specular reflectors. The relative vertical angle, θ, and the horizontal angles between the transmitter and the receiver are considered. The directional impulse response is given by:

$$b(t, \theta, \varphi) = \sum_{l=0}^{L-1} \sum_{k=0}^{K-1} (t - T_l - \tau_{k,l}) \delta(\theta - \theta_l - \omega_{k,l}) \delta(\varphi - \Phi_l - v_{k,l}) \quad (12)$$

where $\Theta$ is the cluster vertical (elevation) angle with uniform distribution on $[0, \pi)$; $\omega$ is the ray vertical angle with zero mean of Laplacian distribution; $\Phi$ is the cluster horizontal (azimuth) angle with uniform distribution on $[0, 2\pi)$; $v$ is the ray horizontal angle with zero-mean Laplacian distribution. Using an antenna simulator with the above model, directional profiles can be generated. A directional simulator of the TEM antenna is used to generate waveforms transmitted and received at different angles. Plot 1800 of FIG. 18 shows the TEM simulated received waveforms where the receiver elevation angle is rotated in steps. Due to the symmetry assumption of the simulated antenna, positive and negative angles result in the same pulse shape, wherefore the simulation is done at 0°, 15°, 30°, 45°, 60°. An exemplary full directional profile generated by the above method is depicted in plot 1900 of FIG. 19. Notice that this profile is noiseless. AWGN can be added if needed.

Sparsity in the time domain unquestionably works in the case of spikes sparsity, i.e., the signal is nothing but a few impulses scattered among the signal (bins) or samples, meaning that the algorithm will recover the signal as spikes rather than a complete pulse shape. The fact that the UWB profile is made of a scaled and shifted version of a reference pulse is ignored. Losing the details of the pulse shape is harming in many modulation schemes. Any change or mismatch in pulse shape will directly affect the detection process.

The reconstruction of the resultant signal from the MP algorithm, assuming sparsity in the time assumption, is based on a 25 GHz sampling frequency (half of the signal samples). In this case the dictionary in equation (3) is a unity matrix.

The normalized error of the recovered signal is 0.48. Spikes are recovered instead of full pulse shape. Reconstruction assuming time domain sparsity requires a high sampling frequency, leading to a conclusion that CS alone, without utilizing the present method, is unreliable to reconstruct the practical UWB signals.

The ultimate goal of practical signal reconstruction algorithm is to be effective and reliable in real-life channels. While CS has reliably reconstructed the noiseless UWB signals based on the IEEE 802.15.4a model, for real channels, accurate and precise channel characterizations cannot be underestimated.

It is shown that applying the predesigned dictionary (shown as plot 300 in FIG. 3) based on the transmitted pulse, assuming that the received pulse shape does not change due to different propagation paths, how the assumption varies from the theoretical results previously discussed. The atom of the dictionary in this case is based on the practical received pulse. Afterward, a variable-width dictionary (shifted pulses and gradually increasing in width) is built to address the effects of dispersion for the later arrivals. Finally, we will go beyond that to consider different pulse shapes received at different angles and how these shapes will enhance the reconstruction outcomes.

Building a dictionary out of only shifted versions of the transmitted signal results in a reconstructed profile composed of only shifted and scaled versions of the transmitted signal, with some interfering with each other. Although, this technique works fine in the hypothesis of the IEEE 802.15.4a model, performance when dealing with practical profiles that are contaminated with AWG noise and impacted by physical effects suffers.

Figure 3:
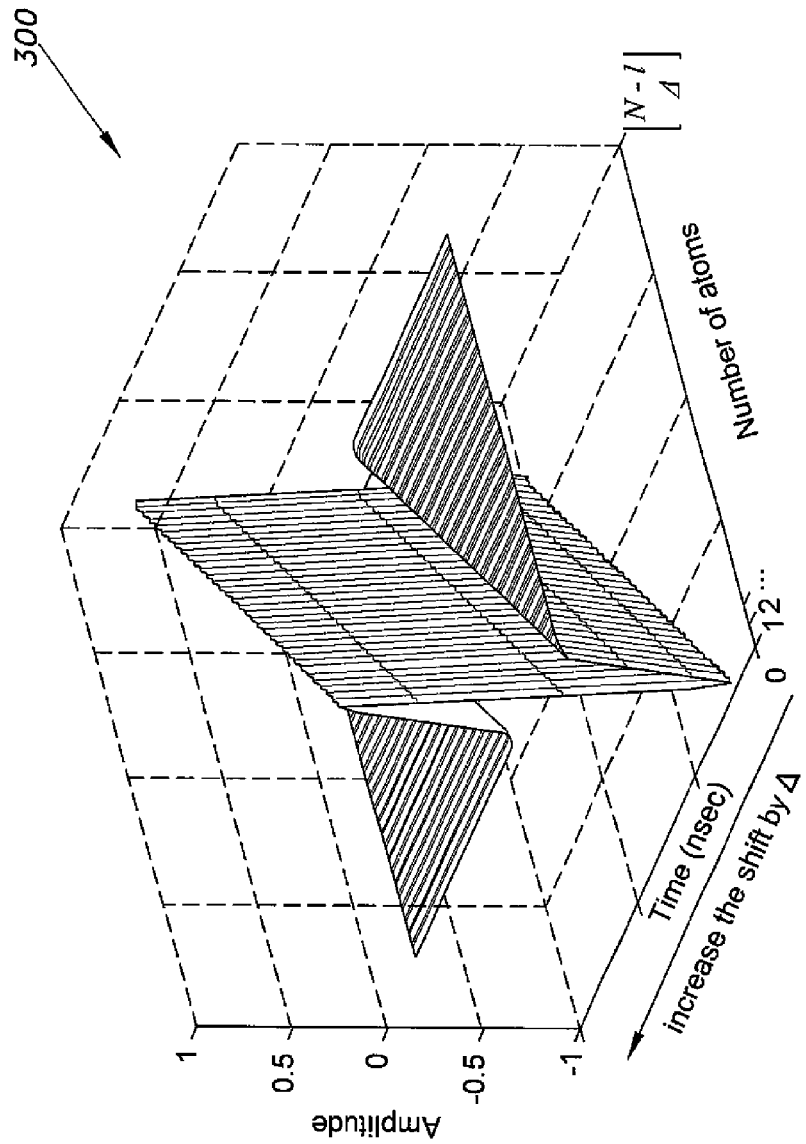
FIG. 3 is a plot showing a predefined dictionary according to the prior art.

As discussed supra, the transmitted pulse used in the practical profiles is a Gaussian monocycle of width 0.34 ns, defined in equation (2). Denote the transmitted pulse by p(t), therefore the dictionary atom is defined as:

$$\psi_j = p(t - j\Delta) = p_n(t - j\Delta)e^{-\frac{(t-j\Delta)^2}{2\sigma^2}} \quad (13)$$
$$j = 0, 1, 2, \ldots$$

where $\Delta$ is the amount of the shift in each atom, as shown in FIG. 3, plot 300.

By implementing this dictionary, we ignore the variation of the pulse shape due to the channel or the antenna response. Since the dictionary's atoms are noiseless, the reconstructed signal should be a noise-free signal. However, errors will appear as a result of wrongly detected atoms. Those atoms have relatively small energy and are negligible.

Figure 20:
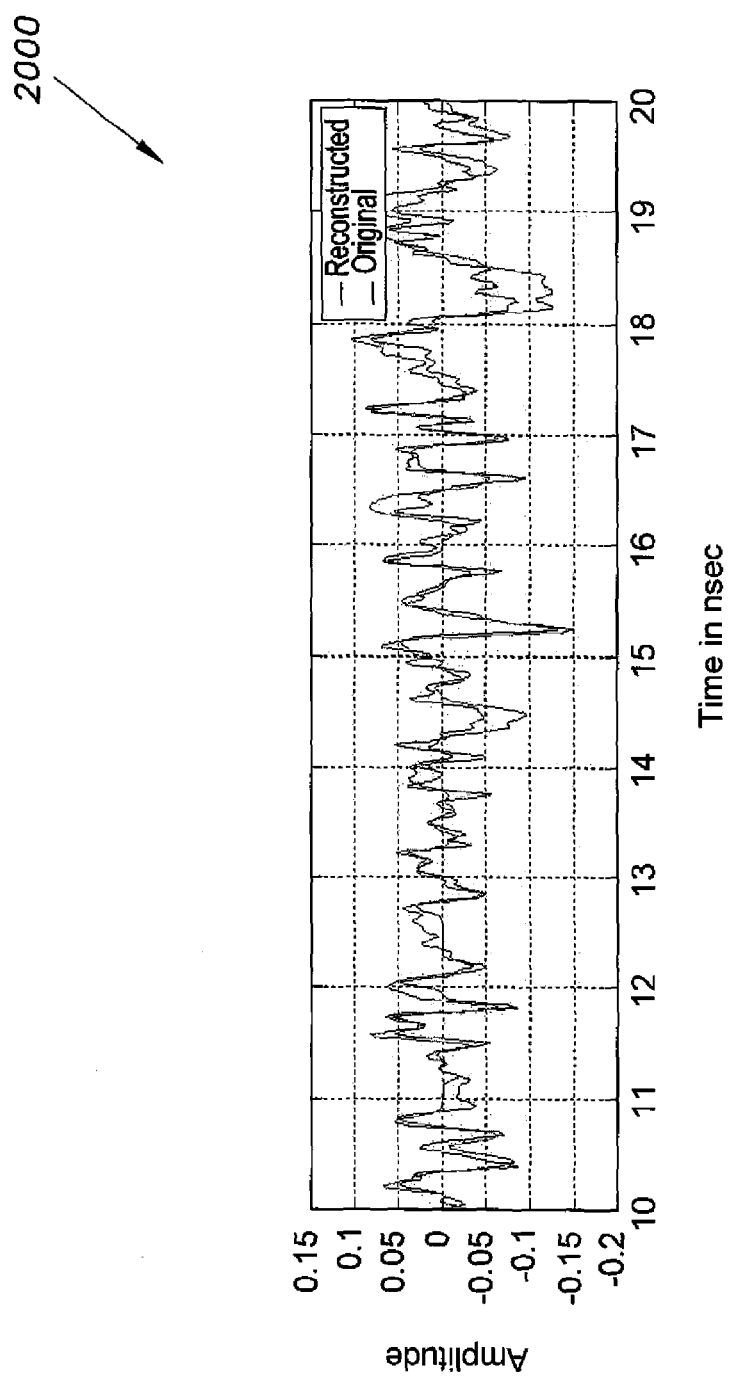
FIG. 20 is a plot showing reconstructed vs. original signals using a transmitted pulse based dictionary.

Implementing the MP algorithm using this dictionary results in the reconstructed signal shown in plot 2000 of FIG. 20. It has a normalized error of 0.324 and MSE of $3.1 \times 10^{-4}$. The normalized error is reduced by about 68 percent compared with the previous case where sparsity in time domain is assumed. Hence, the practical UWB signal is sparser in a pre-defined dictionary, "Multipath Diversity", than in the time domain. None of the effects of channel or antenna has been included in this scenario.

Figure 4:
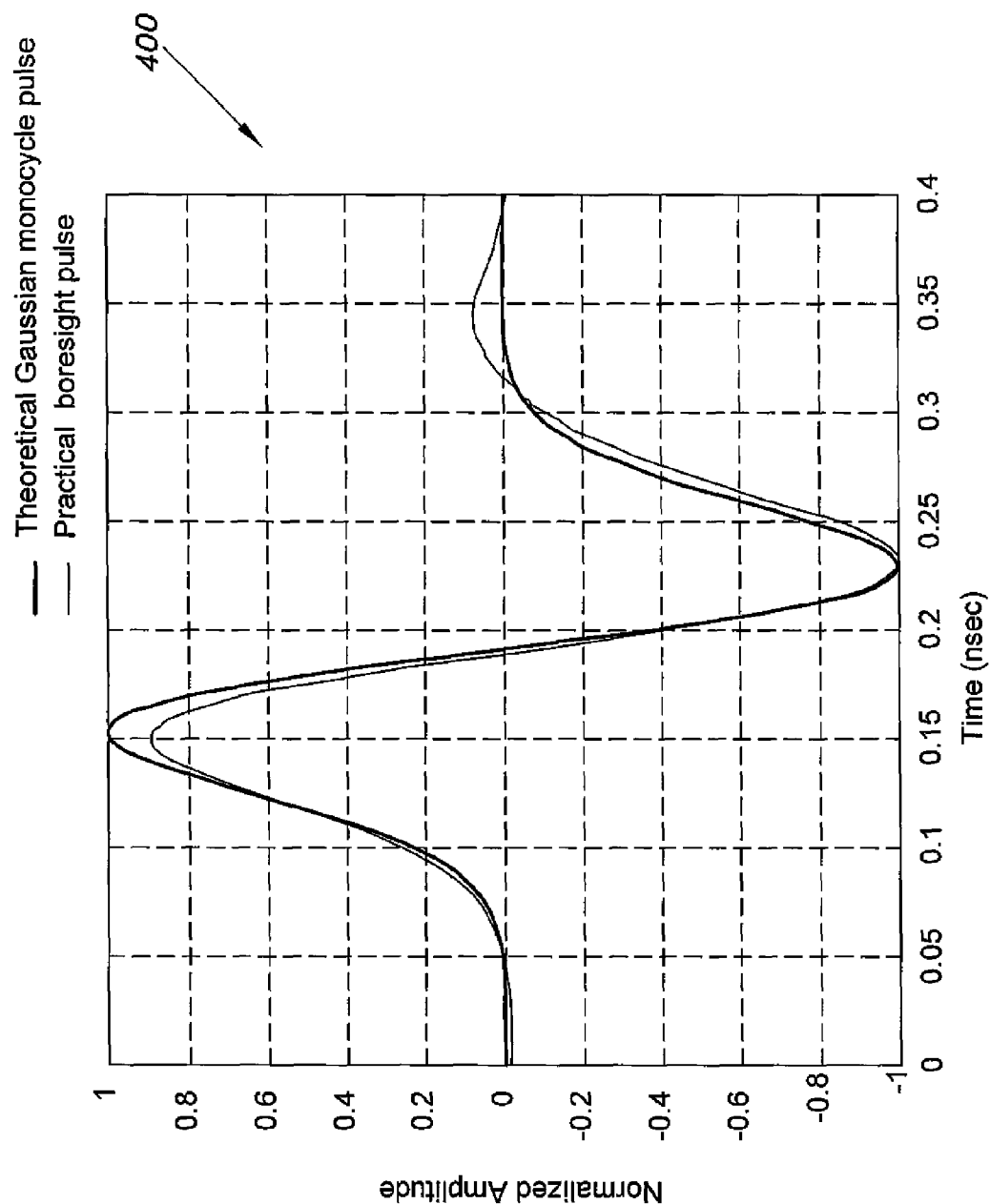
FIG. 4 is a graph showing the contrast between practical and theoretical Gaussian Pulses.
Figure 5A:
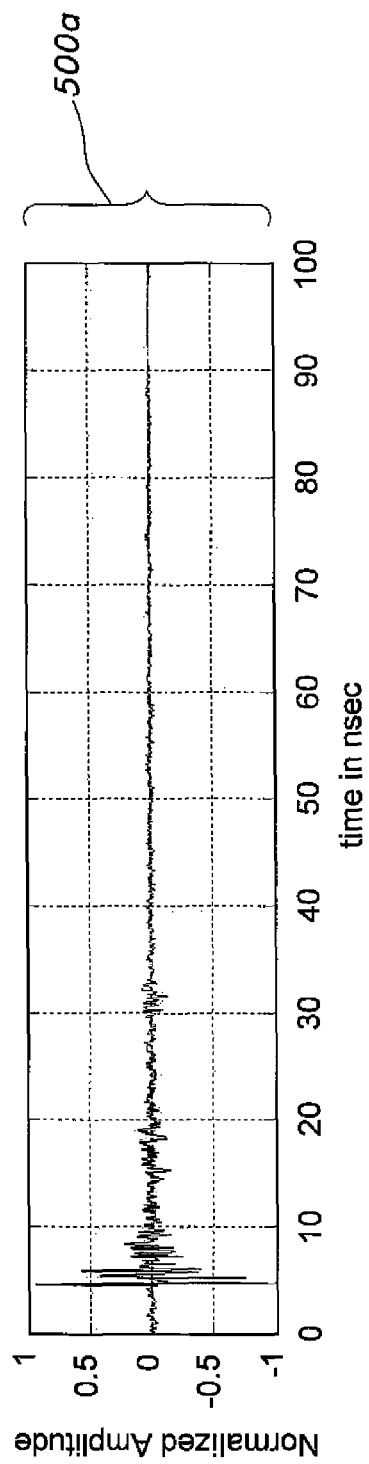
FIG. 5A is a plot showing an original ultra-wideband radio signal.
Figure 5B:
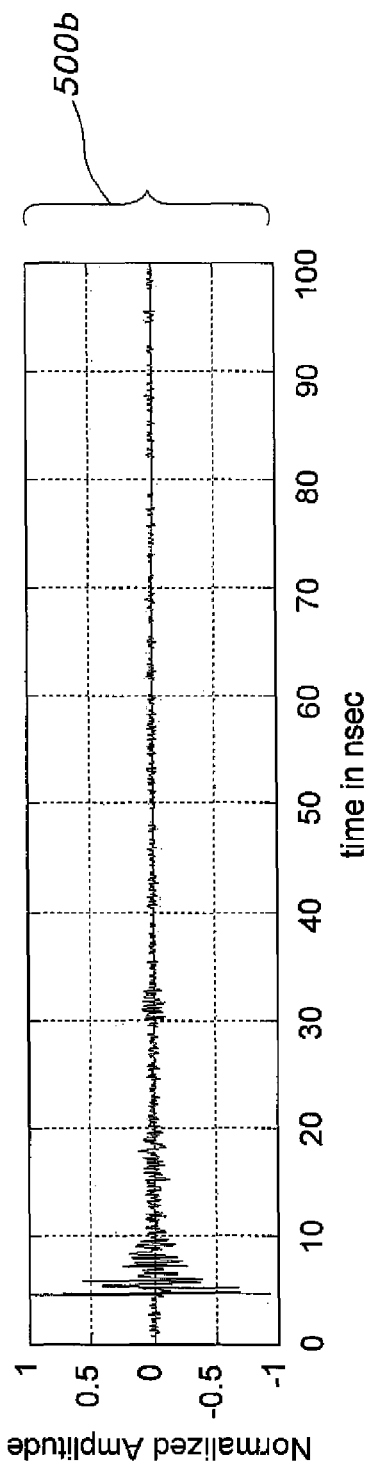
FIG. 5B is a plot showing the signal of FIG. 5 reconstructed using a practical dictionary.
Figure 5C:
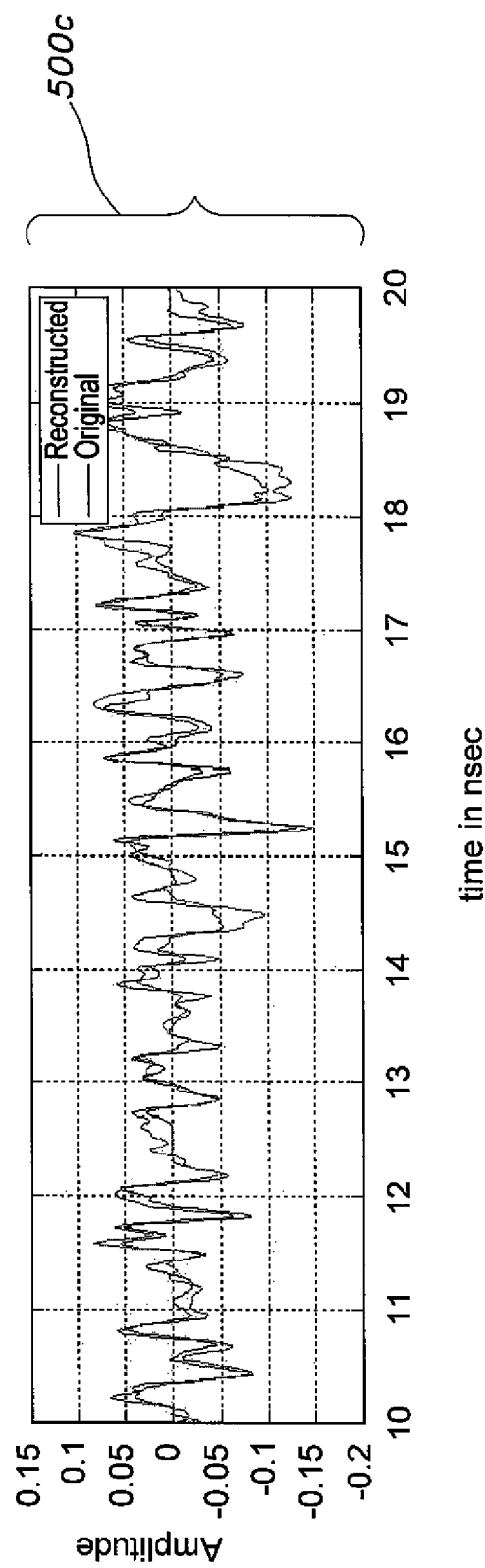
FIG. 5C is an overlay plot showing the original and reconstructed signals of FIGS. 5A and 5B using the practical dictionary.

The real life transmitter does not generate perfect Gaussian signals, as was assumed earlier. The impact of utilizing a measured atom, rather than the theoretical one, is examined. Plot 400 of FIG. 4 contrasts the theoretical (Transmitted) Gaussian pulse and the practical pulse received at zero degree angles of the transmitter and the receiver antennas (boresight). It depicts the dispersion and corruptions caused by the physical channel, which was not considered previously. In order to include the physical effects of UWB channels, a practical dictionary is built based on the practical pulse shown in plot 400 of FIG. 4. Each atom of the practical dictionary is a shifted version of the practical pulse as:

$$\psi_j = p_0(t - j\Delta) \quad (14)$$
$$j = 0, 1, 2, \ldots \left\lfloor \frac{N - l_0}{\Delta} \right\rfloor$$

where, $p_0$ is the practical pulse received at zero degree, and $l_0$ is the length of the practical pulse received at zero degree. Unlike the theoretical based dictionary, applying MP using a practical dictionary results in more improvements in signal reconstruction. This is shown in FIGS. 5A, 5B, plots 500a (original signal) and 500b (reconstructed signal) where the amount of normalized error has been reduced to be 0.285. More visual inspection is depicted in plot 500c of FIG. 5C as a zoomed in version of FIGS. 5A and 5B. The UWB received profile may be viewed as a series of pulses with specific inter-pulse spacing. Each path of the multipath channel has its own impulse response or frequency transfer characteristics. The frequency independence assumption is widely adopted in tapped delay line models. This assumption is not convincing for UWB systems, as in the case for radar target identification.

Therefore, individual path distortion and dispersion should be considered in the design of a dictionary that is associated with the UWB channel propagation and antenna responses.

Figure 6A:
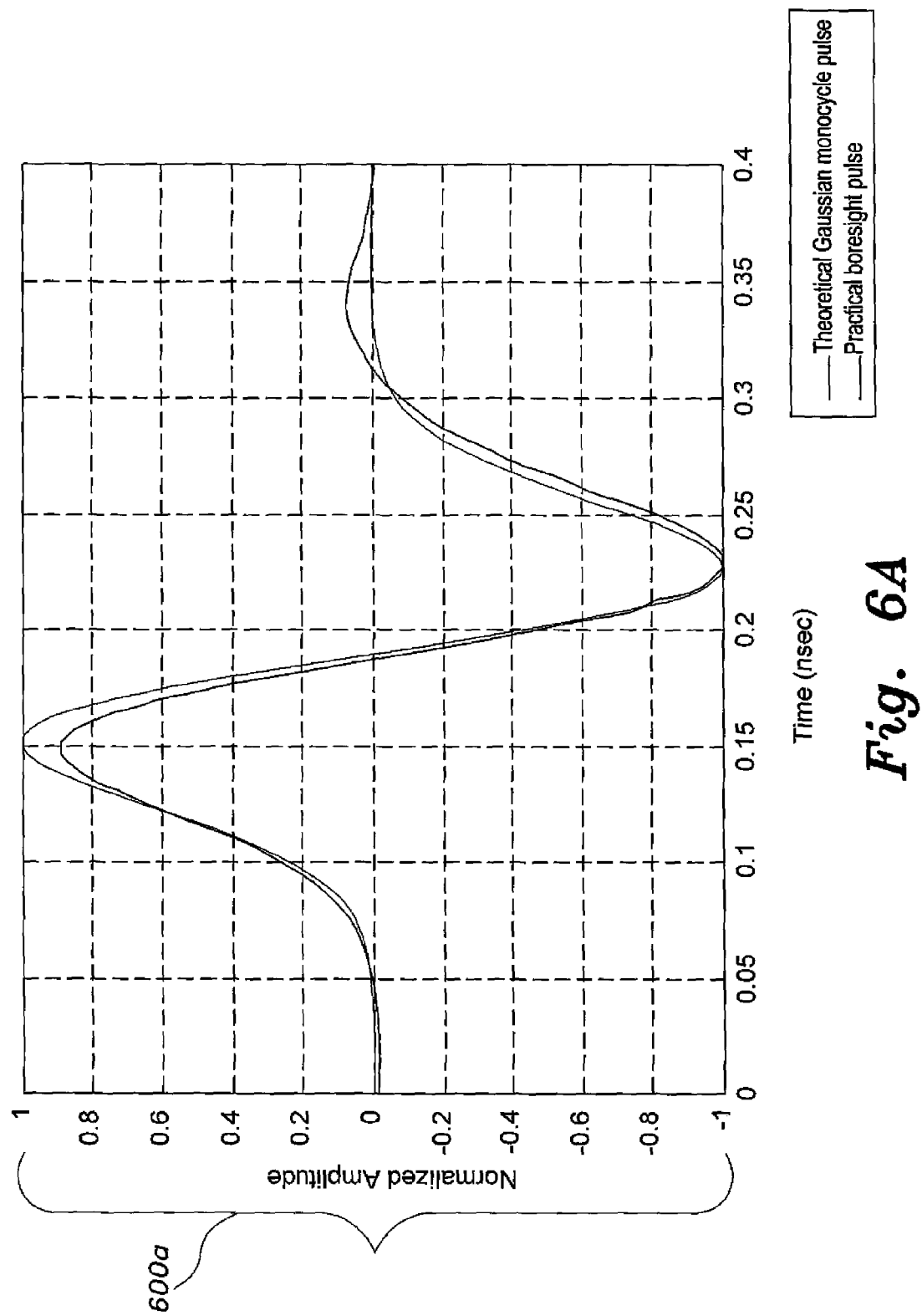
FIG. 6A shows a 0° plot of Gaussian monocycle pulse signals.
Figure 6B:
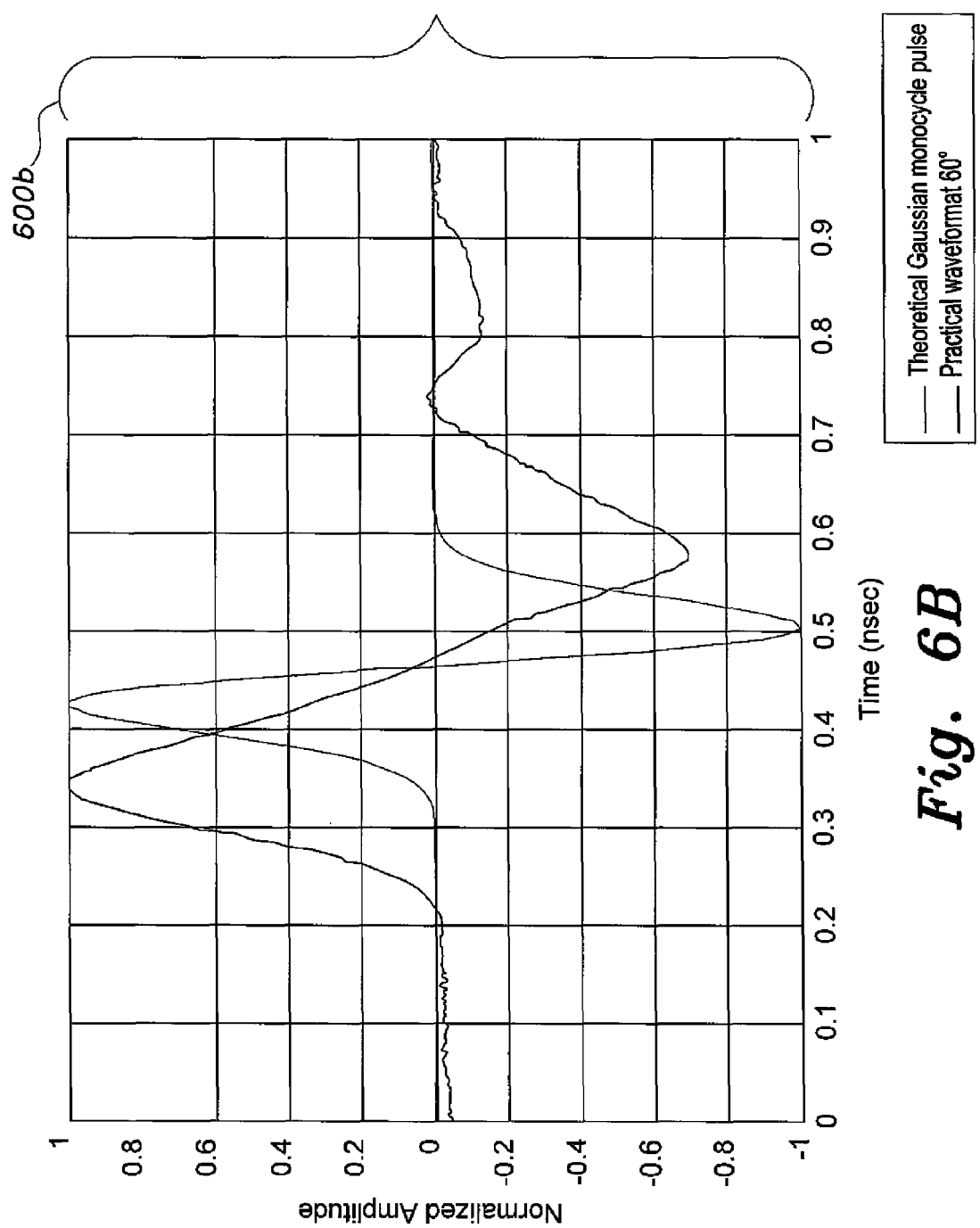
FIG. 6B shows a 60° plot of Gaussian monocycle pulse signals.

Pulse dispersion should be carefully addressed because it is an inevitable adverse effect induced by the physical characteristics of the UWB channels. Although the realistic channel has many effects on the transmitted pulse, dispersion is one of the most significant effects. Pulse dispersion decreases the correlation between the transmitted and the received pulses more than other effects do, which, in turn, causes degradation to MP reconstruction. The temporal dispersion varies with the antenna angles, as shown in plots 600a and 600b in FIGS. 6A and 6B, respectively. The pulse width increases as the relative antenna angle increases. It is observed statistically that late arrivals are correlated with larger angles, and hence will suffer from more dispersion. Building a new dictionary that assigns wider pulses to later arrivals is a rational idea.

The variable width dictionary is a dictionary composed of shifted and widened versions of the theoretical pulse. The pulse duration of the first atom is set to be equal to the practical boresight duration and zero shift. The next atoms have a gradual increase in duration and delay. The last atom will have a duration to match the duration of the practical waveform received at the maximum reception angle for the used antenna, which is 60° in the case of the TEM horn used. Let the $j^{th}$ atom in the variable width dictionary be indicated by $\psi_j$, given by:

$$\psi_j = p(\sigma_j, j\Delta) j = 0, 1, 2, \ldots, \quad (15)$$

where $\sigma_j$ is the parameter to control the increment of the pulse duration in each atom. Thus, the maximum value of j is controlled by the length of the received signal; i.e., the atom generator will be stopped if the shifting exceeds the signal length.

Figure 7:
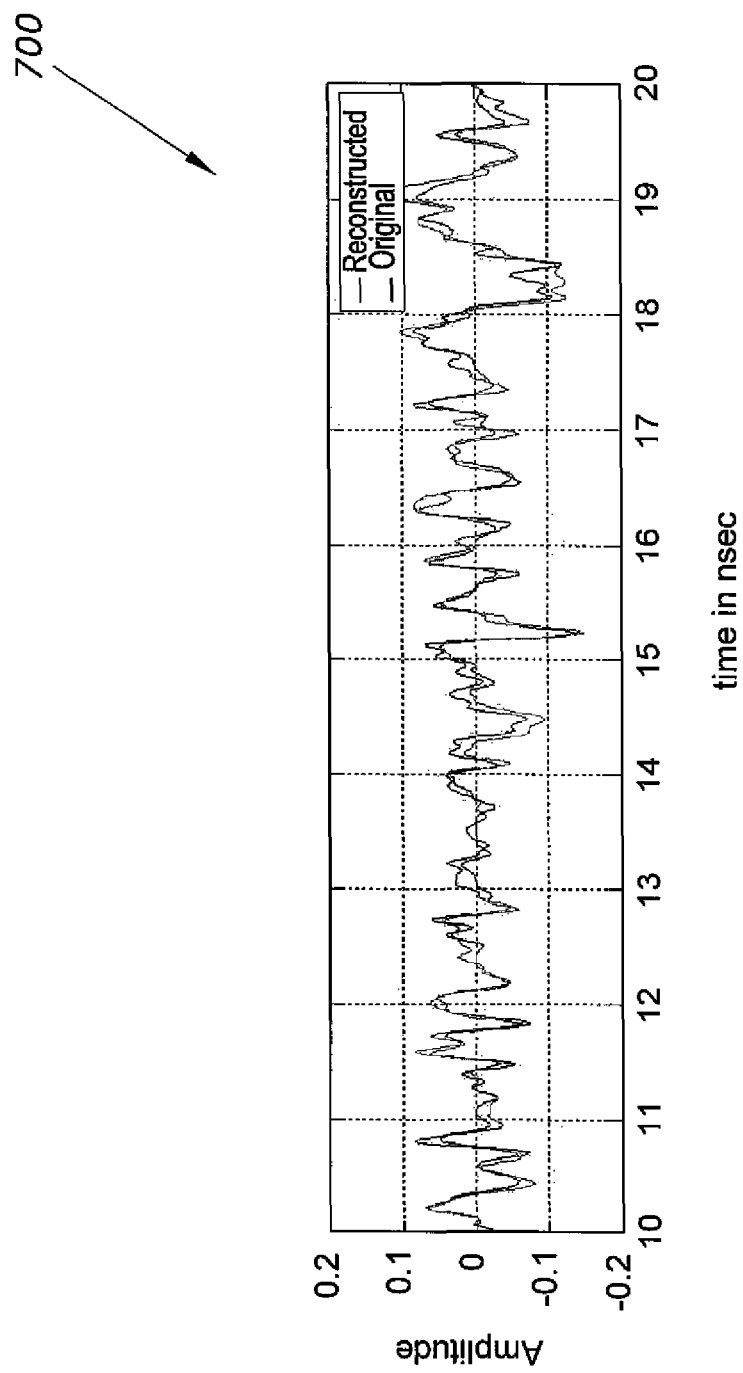
FIG. 7 shows an original vs. reconstructed ultra-wideband radio signal using a variable width dictionary.

Using the variable width dictionary to reconstruct an UWB signal results in the reconstructed signal depicted in plot 700, shown in FIG. 7, which has a normalized error of 0.257. The reconstruction quality is better than the two cases of the Gaussian pulse-based dictionary, where no dispersion is assumed. Plot 700 shows comparative and zoomed versions of the original and the reconstructed profiles.

The hypothesis that the received pulses through different paths have the same waveform requires that both the transmitter and the receiver antennas have spherical pattern shapes at all frequencies. Recall that if the antenna is electrically large compared to the wavelength of the center frequency of the received signal, the waveforms radiated in different directions from the transmitter antenna look considerably different in the far field region. This fact can be used to improve the reconstruction.

Figure 21A:
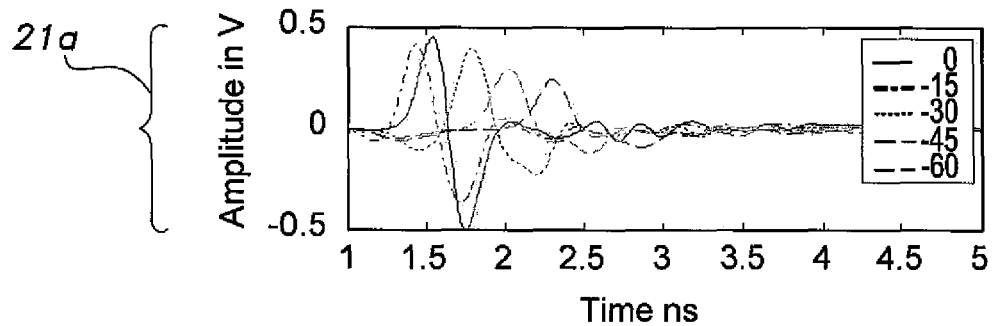
FIG. 21A shows plots of a received Gaussian pulse for different horizontal negative angles.
Figure 21B:
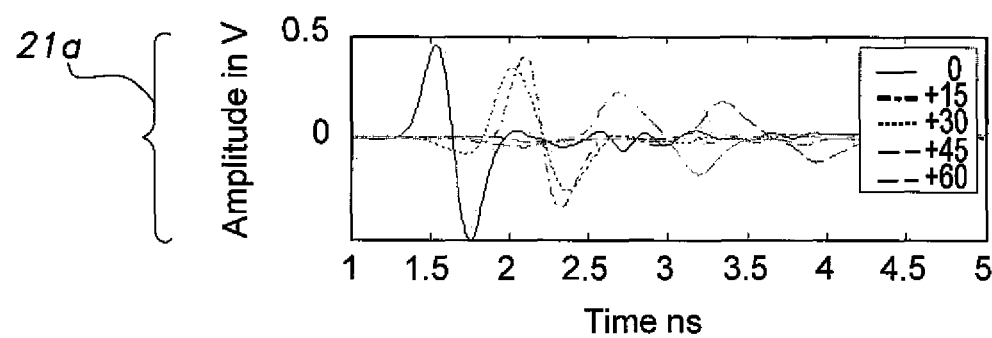
FIG. 21B shows plots of a received Gaussian pulse for different horizontal positive angles.

Plots 21a and 21b of FIGS. 21A and 21B demonstrate the variation and the dispersion of pulse shapes at different negative received angles and different positive received angles, respectively. Therefore, the practical profile will be made up of shifted, scaled, dispersed, and slightly modified pulses of the transmitted signal. The measurements in FIGS. 21A and 21B were carried out in an open environment to avoid any reflections by any obstacle, leading, thus, to pure measurements impacted by the antenna effects only. Furthermore, the antenna effects vary from one antenna to another according to its characteristics and radiation pattern.

Accordingly, the multi-atom directional dictionary is made up of different pulse shapes corresponding to the different received angles. Let the received pulse at any angle be called directional reference. For the measurements in hand, there are nine directional references, where the transmitter and the receiver antenna are kept at a fixed height and fixed position.

The received antenna is then rotated along the elevation angle by 15° steps. Thus, the measurements are performed at the angles of 0°, ±15°, ±30°, ±45°, ±60°.

Each directional reference will be shifted along the signal length to compose the directional dictionary. Denote the atom of the directional dictionary by $\psi$, given by following:

$$\psi_{ij} = p_i(t - j\Delta) \quad (16)$$
$$i = 1, 2, \ldots 9; \; j = 0, 1, 2, \ldots \left\lfloor \frac{N - l_i}{\Delta} \right\rfloor.$$

The first subscript, i, indicates the directional reference number, and the second subscript, j, indicates the amount of shift; $p_i(.)$ is the $i^{th}$ directional reference; $\Delta$ is the minimum step shift; and $l_i$ is the length of the $i^{th}$ directional reference. Since there are nine directional references, the first subscript is varying from 1 to 9. Subsequently the directional dictionary can be represented as:

$$\Psi = [\psi_{1_0}(t), \ldots, \psi_{1_{n-l_1}}(t), \psi_{2_0}(t) \ldots, \psi_{9_{n-l_9}}(t)]. \quad (17)$$

Figure 8:
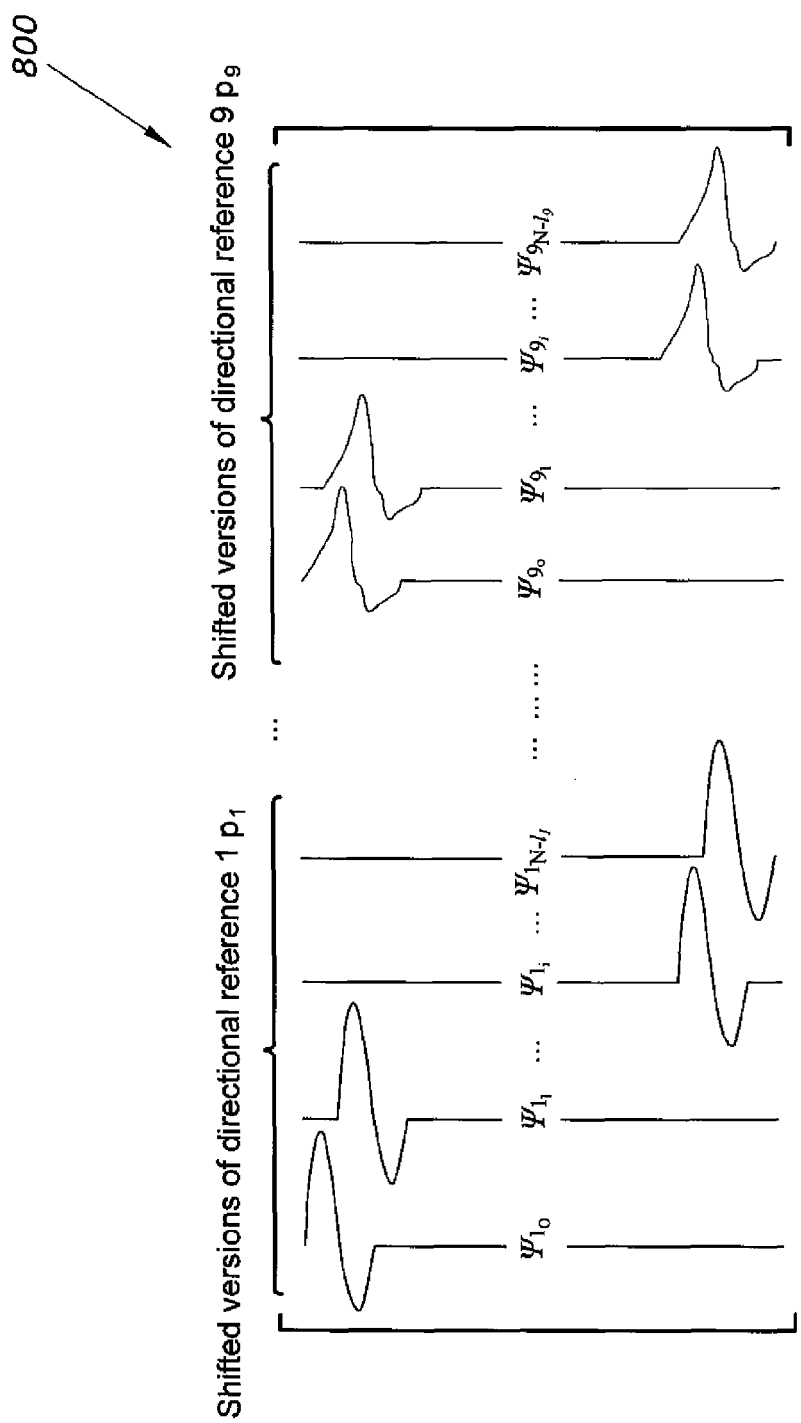
FIG. 8 shows an illustration of a directional dictionary in a method for compressive sensing, reconstruction, and estimation of ultra-wideband channels according to the present invention.

An illustrative diagram of the resultant dictionary is shown in the dictionary plot 800 of FIG. 8. The multi-atom directional dictionary can also be viewed as a multi-dimensional dictionary, or as being built up of sub-dictionaries of all references.

Using the directional dictionary gives matching pursuit (MP) a higher chance to find atoms that have large correlation to the received signal, as well as increases the sparsity of the UWB signals.

Figure 9:
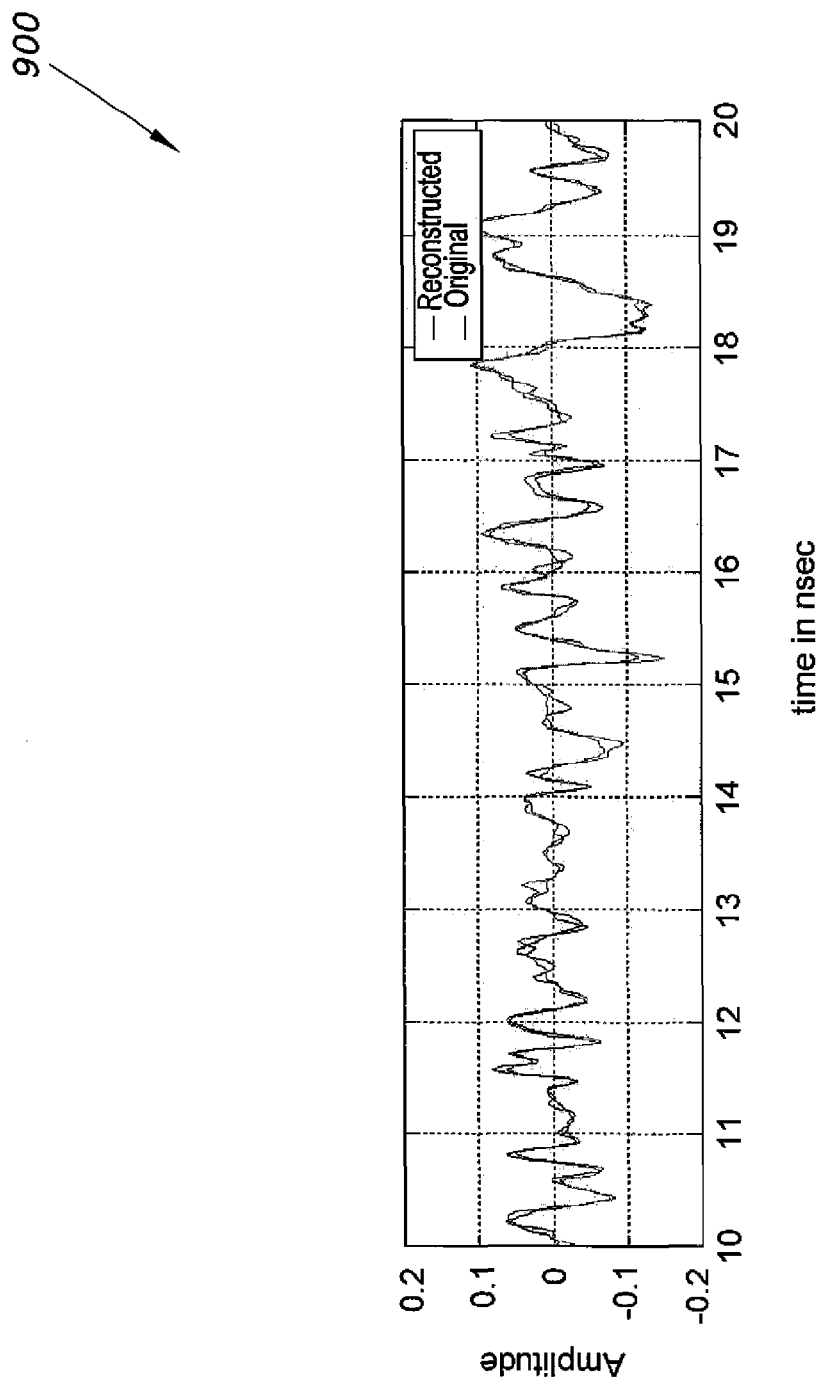
FIG. 9 shows reconstructed vs. original signals using a multi-atom directional dictionary in a method for compressive sensing, reconstruction, and estimation of ultra-wideband channels according to the present invention.

Once defined, the directional dictionary may be used as a sparsity domain to reconstruct a realistic UWB signal. Plot 900 of FIG. 9 shows a zoomed in version of the reconstructed signal using the multi-atom directional dictionary vs. the original signal. The reconstruction, indeed, has improved, and the normalized error is now less by more than 51 percent, compared with the reconstruction error in the case of the aforementioned boresight dictionary. The normalized error is now 0.24 and the MSE=$1.27 \times 10^{-4}$.

Figure 22:
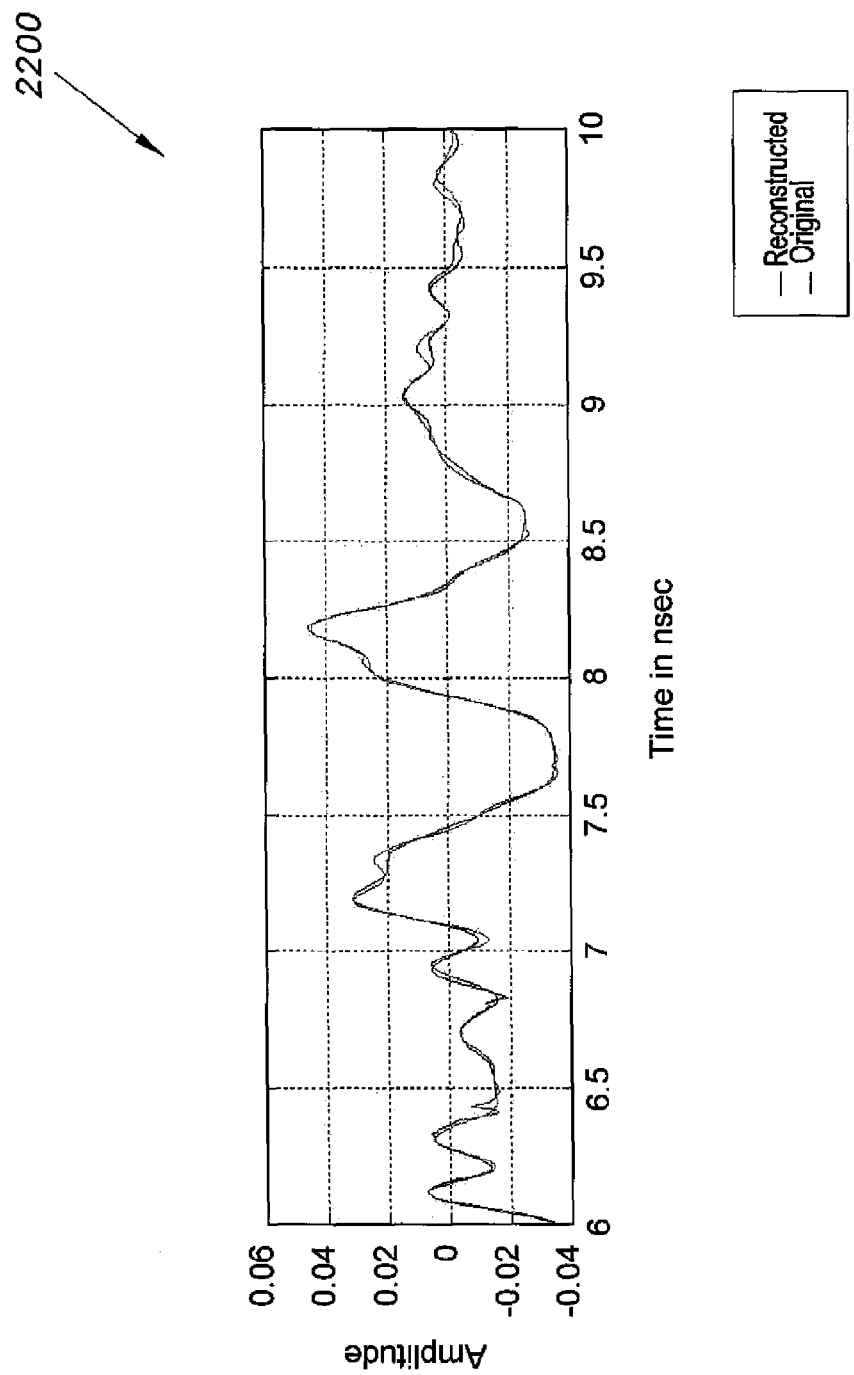
FIG. 22 shows original vs. reconstructed signals using a simulated directional dictionary in a method for compressive sensing, reconstruction, and estimation of ultra-wideband channels according to the present invention.

The same results were verified by simulation using the directional model. A simulated waveform is used to form atoms in the simulated multi-atom dictionary. This dictionary is then used for reconstruction. The normalized error is 0.0487 and the MSE is $2.19 \times 10^{-8}$. As a result of the noise-free profiles, the reconstruction error of the directional model is much less than the measure directional dictionary. Plot 2200 of FIG. 22 shows the original vs. reconstructed signal to visually depict the quality of the reconstruction.

An intuitive question is raised, viz., do all the directional references contribute by the same amount of energy? The prior art shows that many components from the measurement profiles are identified as having a large elevation angle of arrival. This fact can be proven in our approach of multi-atom directional dictionary by analyzing the output vector "θ" of the MP algorithm. The mission of the MP algorithm is to allocate the strongest atoms in the dictionary and then provide the contribution amount of all atoms as vector "θ". Consequently, the vector is analyzed to get the number of occurrences of each directional reference, as well as the amount of that contribution.

Figure 23:
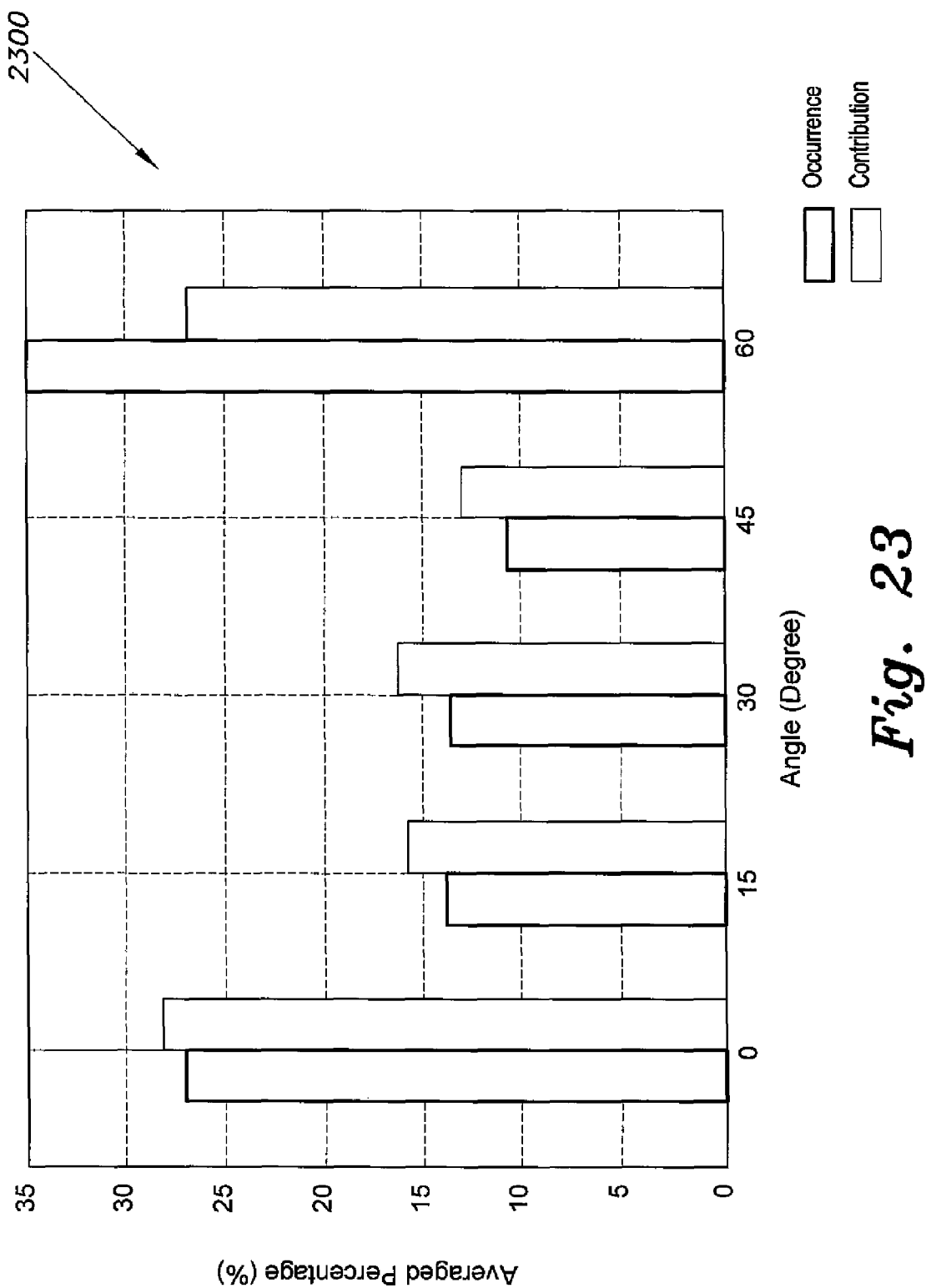
FIG. 23 shows the number of occurrences and amount of contribution of each directional reference.

Bar graph 2300 of FIG. 23 depicts the number of occurrences and the amount of contribution of each directional reference, where the positive and negative references of the same angle have been combined.

It is inferential that the directional reference of 60° has the largest number of occurrences. On the other hand, the directional reference of 0° contributes more than that of any other reference, even though it has fewer occurrences than the one of 60°. This is an intriguing result because the first and the strongest paths have to be in the shortest path. The late arrivals, which have weaker energy and more temporal dispersion, match the dispersion of the 60° reference.

Although complexity due to the demand of a high sampling rate has been reduced, the computational requirement in the MP algorithm has been increased as a consequence of the large size of the multi-atom dictionary. The complexity of MP can be approximated to $O(CMNT_0)$, where M is the number of measurements, $T_0$ is the maximum iterations, N is the number of samples in the UWB signal, and C is a constant that depends on the dictionary ($\Psi$) size. In the case of multi-atoms, the size of the dictionary, and hence C, grows linearly with the number of atoms. The complexity of MP increases linearly as the size of the used dictionary. If we assume that the durations of all atoms in a nine atoms dictionary are equal, the complexity in this case is nine-fold of the boresight dictionary.

Since the multi-atom directional dictionary is composed of a sub-dictionary of each directional reference, we can reduce the complexity of MP by rebuilding a new dictionary out of the strongest contributed references, i.e., the references of 0° and 60° in the exemplary case.

Figure 10:
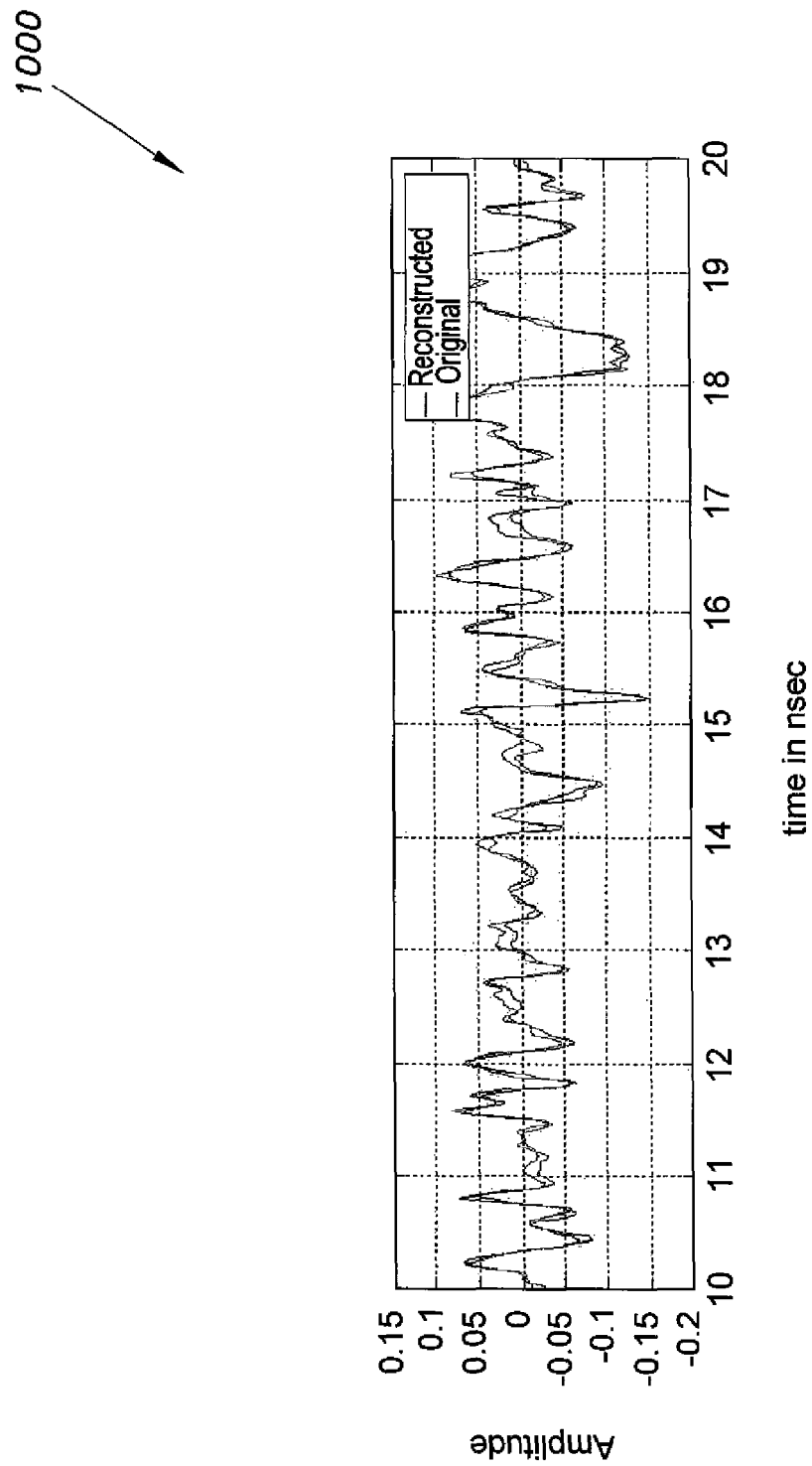
FIG. 10 shows original vs. reconstructed signals using a strongest atoms dictionary in a method for compressive sensing, reconstruction, and estimation of ultra-wideband channels according to the present invention.

The reconstructed signal using the strongest atoms dictionary, as shown in plot 1000 of FIG. 10, has a normalized error of 0.209, which is very close to the error when using the full multi-atom directional dictionary.

Although the weak references have been neglected and their dictionaries removed, the reconstruction error did not increase dramatically from the error shown in plot 900 of FIG. 9. The amount of contribution of the neglected directional references is 45% of the reconstructed signal. However, this does not mean that we are not able to capture this amount of the signal energy. Instead, MP will find the best match in the existing references, leading to a small error due to the difference in shape. Accordingly, using the strongest directional references does not adversely affect the reconstruction capability, and it definitely reduces the complexity of MP algorithm. Using more than one dictionary with atoms having different expected shapes improves the reconstruction dramatically.

Figure 11:
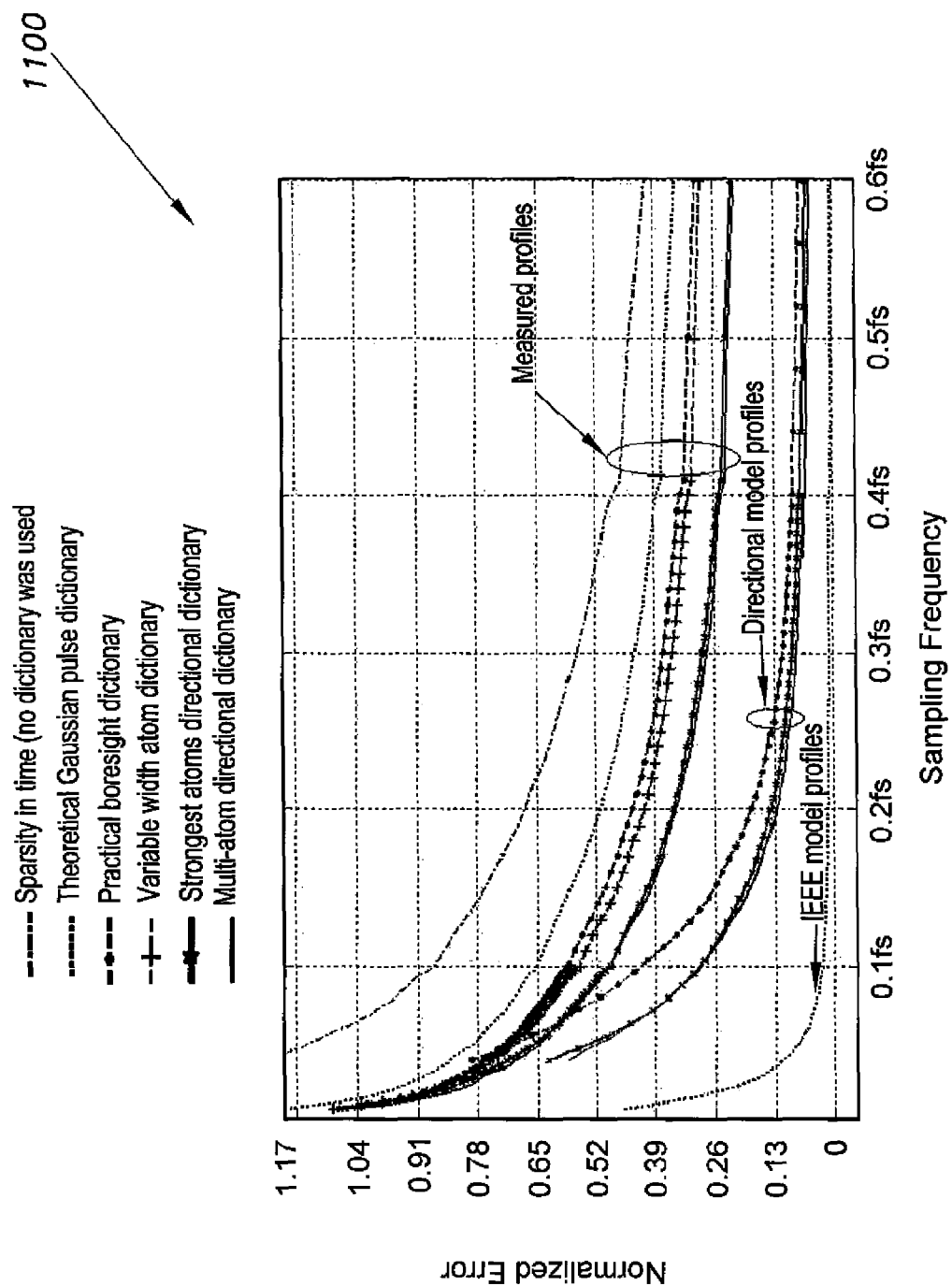
FIG. 11 shows a plot of normalized error vs. sampling frequency for the various dictionaries in a method for compressive sensing, reconstruction, and estimation of ultra-wideband channels according to the present invention.

Reconstruction results for all available practical profiles in a statistical sense are presented. All the proposed methods are evaluated in reconstructing measured profiles. The directional model profiles are used for the case of the boresight-signal dictionary, the multi-atom directional dictionary, and the strongest path directional dictionary. As is known in the art, the reconstruction ability of CS is a function of the number of random projections, i.e., the sampling rate. Hence, the normalized error of the reconstruction is plotted versus sampling frequency. For the purpose of fair comparison, all signals have the same length. The novel MP termination criteria discussed above have been selected. The practical results are compared against the theoretical (optimum) result obtained for the case of the IEEE 802.15.4a model. It is observable, from plot 1100 of FIG. 11, that the increment in sampling frequency enhances the reconstruction quality in all approaches. The largest reconstruction error occurs in the case of the time sparsity assumption, where no dictionary was used. The error is reduced by using a Gaussian pulse-based dictionary, but it is still relatively high. Since they are more practical, the boresight-based dictionary and the variable width atom dictionary enhanced reconstruction, compared to the case of the Gaussian pulse-based dictionary.

Significant reconstruction improvement is achieved by using the directional dictionaries, where the error in the case of the multi-atom dictionary and the strongest atom dictionary is the least one, in contrast to the error using the other dictionaries. The dictionary of the strongest atoms performs very closely to the multi-atom dictionary. The variable width dictionary does not consider the change in pulse width. Hence its performance is worse than the directional dictionaries, but it is still better than the boresight-based dictionary.

Due to the large similarity between the dictionary atoms and the profile components, the error in the IEEE curve declines faster at a low sampling frequency. Since the directional dictionaries do not include the arrivals from all angles, the decline in practical profiles is less.

Figure 12:
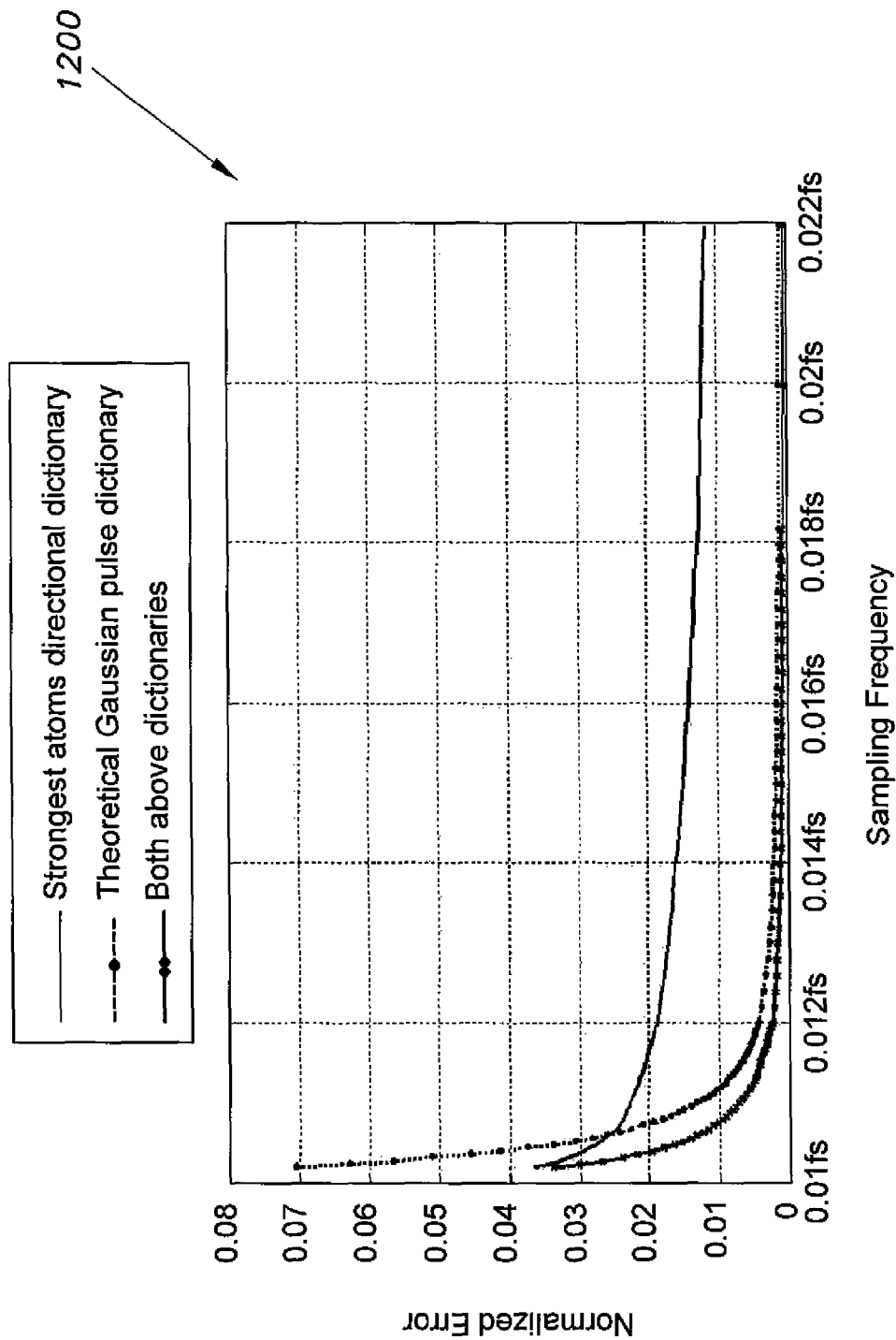
FIG. 12 is a plot showing behavior of the practical dictionaries to reconstruct IEEE profiles.

Since the profiles of the directional model are noiseless, (unlike the practical profiles), the behavior of the directional model is better than the measured profiles, and they almost emulate the measured profiles when noise is added In order to examine the behavior of the practical dictionaries to reconstruct the IEEE profiles, the IEEE profiles are reconstructed using the strongest atoms directional dictionary that has the boresight and received waveforms. Then the strongest atom dictionary is merged with the Theoretical Gaussian dictionary. Plot 1200 of FIG. 12 shows both cases compared with the case of the theoretical Gaussian dictionary behavior.

Using the strongest atom dictionary to reconstruct the IEEE profiles is better than using the Gaussian pulse dictionary, especially in the range of a low sampling frequency. This can be interpreted as follows: the interfering waves might result in a change in pulse shape that matches a practical atom. Consequently, the sparsity of IEEE has increased in the strongest atom dictionary.

With respect to accurate UWB channel estimation, the required sampling rate is very high. In some cases, it exceeds 60 GHz. CS implementation can be extended to a broader range of signal processing and statistical inference tasks. CS is well suited for UWB channel estimation. The present method takes advantage of CS and the proposed dictionaries to estimate the UWB channel in practical environments.

Consider a simple baseband communication model transmitting a pulse p(t) through a noise-free UWB communication channel. The received UWB signal, $r_x(t)$ can be modeled as:

$$r_x(t) = p(t) * h(t) = \sum_{k=0}^{K-1}\sum_{l=0}^{L-1} \alpha_{k,l} p(t - T_l - \tau_{k,l}), \quad (18)$$

where p(t) is the ultra-short pulse expressed in equation (2). Moreover, h(t) is the impulse response of the UWB, modeled as:

$$h(t) = \sum_{k=0}^{K-1}\sum_{l=0}^{L-1} \alpha_{k,l} \delta(t - T_l - \tau_{k,l}), \quad (19)$$

where δ is the Dirac delta function, $\tau_{k,l}$ is the delay, and $\alpha_{k,l}$ is the gain associated with the $l^{th}$ path within the $k^{th}$ cluster of the IR-UWB channel, L is the number of propagation paths, and K is the number of clusters.

By looking at the UWB channel, given by equation (18), we realize that this channel model consists of a set of parameters as $\{\alpha_i, \tau_i\}_{i=1}^{L}$, which represent various propagation paths that have to be well estimated. As is known in the art, the number of multipath components could be quite large, leading to large time dispersion in the transmitted pulse. The average number of multipaths for LOS propagation is approximately 1160 paths in an indoor environment and within 300 Nano second, while the average number of paths capturing 85% of the energy is just 70 paths. Hence, many of those paths are negligible. Thus, determining the most significant paths, indicated by $L_c$, and eliminating the weak paths leads to a reduction in channel complexity.

The MP signal reconstruction approach is a searching process in the dictionary for the strongest paths (atoms) embedded in "the residual signal". The path contribution is dropped from the residual signal. If the targeted residual error is not reached, the search and drop process is iteratively repeated, as shown in the matching pursuit algorithm 200. When MP is used for channel estimation, the outcome is a vector that is composed of the contribution of atoms corresponding to various propagation paths. This vector is expressed as:

$$\Theta = [\theta_1, \theta_2, \ldots, \theta_Z]^T. \quad (20)$$

Figure 24A:
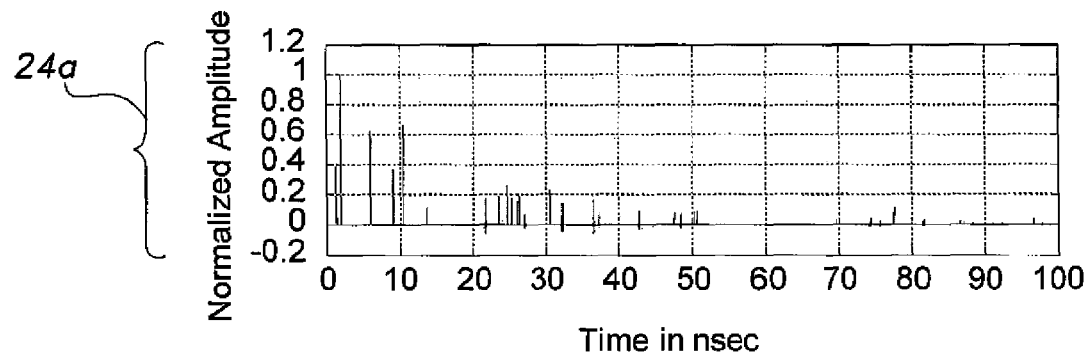
FIG. 24A shows a plot of an original channel impulse response.

The received signal is the weighted sum of the atoms in the dictionary, mathematically written as:

$$r_x = \sum_{i=1}^{Z} \theta_i \psi_i(t) \quad (21)$$

where $\theta_i$ is an approximation of the path gain related to the $i^{th}$ propagation path, and the atom $\psi_i$ in the dictionary $\Psi$ is a shifted version of the transmitted pulse. Furthermore, the path delay is determined by observing the delay location of the $i^{th}$ component in the received UWB signal. Accordingly, we can derive a technique to estimate the channel parameters out of vector Θ, i.e., the path gain and the corresponding delay of the most significant paths via the MP algorithm 200. Plot 24a of FIG. 24A shows a sample impulse response based on the IEEE 802.15.4a for 100 nsec. The estimated channel response, Θ, using a transmitted pulse multipath based dictionary at half the sampling rate, is shown as plot 24b in FIG. 24B.

Consider the sparse vector Θ given in equation (20) obtained by the MP algorithm. To start with the strongest paths, $\theta_k$ is sorted in descending order as "for k=1, ..., Z" to be the set $\{|\theta_1|, |\theta_2|, \ldots, |\theta_Z|\}$.

Figure 24B:
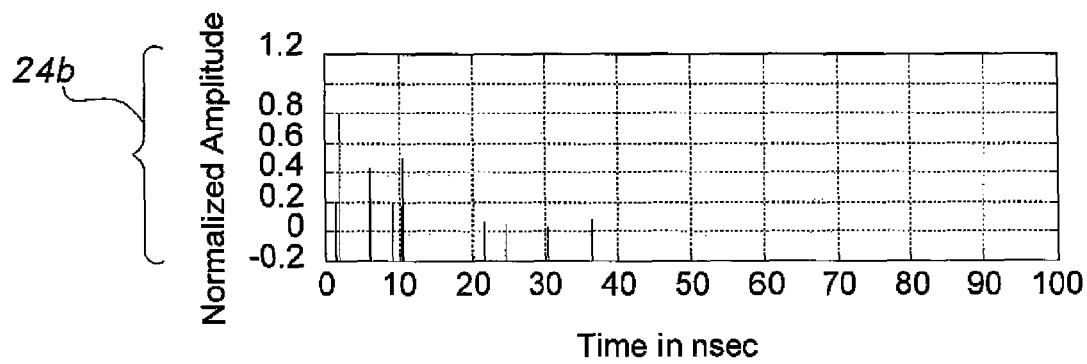
FIG. 24B shows a plot of a CS-estimated channel impulse response using 10 strongest paths.

Accordingly, $\theta_1 = \max\{|\theta_1|, |\theta_2|, \ldots, |\theta_Z|\}$ and $\theta_z = \min\{|\theta_1|, |\theta_2|, \ldots, |\theta_Z|\}$. Let $l_k$ be the index in the sparse vector of the $k^{th}$ sorted element. Therefore, the estimated channel parameters for the propagation path are:

$$\hat{\tau}_i = l_i \Delta$$

$$\hat{\alpha}_i = \theta_{l_i}, \quad (22)$$

where, $\hat{\tau}_i$ and $\hat{\alpha}_i$ are the path delay and the path gain, respectively, for i=1, 2, ... $L_c$ and Δ is the minimum shifting step used to build the dictionary. The number of MP iterations, $T_0$, can be set to $L_c$ to recover the strongest paths of the UWB channel. The number of iterations in channel estimation is much less than that needed for signal reconstruction. To illustrate this idea, plot 24b of FIG. 24B, shows only 10 taps of the channel impulse response. These taps are obtained with 10 iterations, i.e., the energy captured by these 10 paths is 90 percent of the full channel realization.

Figure 25A:
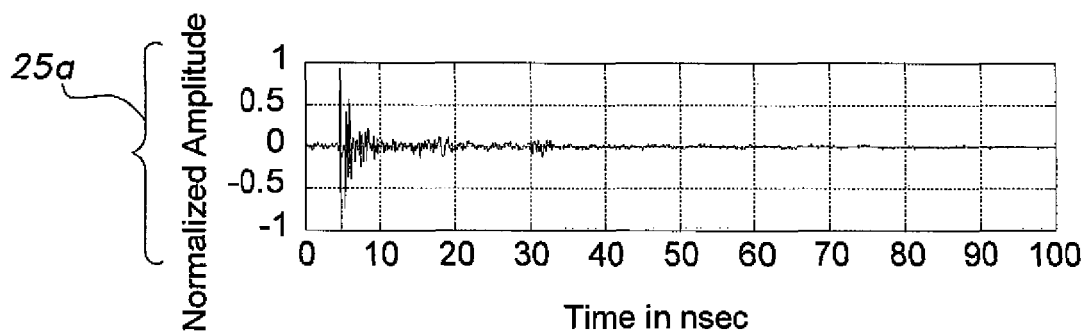
FIG. 25A shows a measured profile.
Figure 25B:
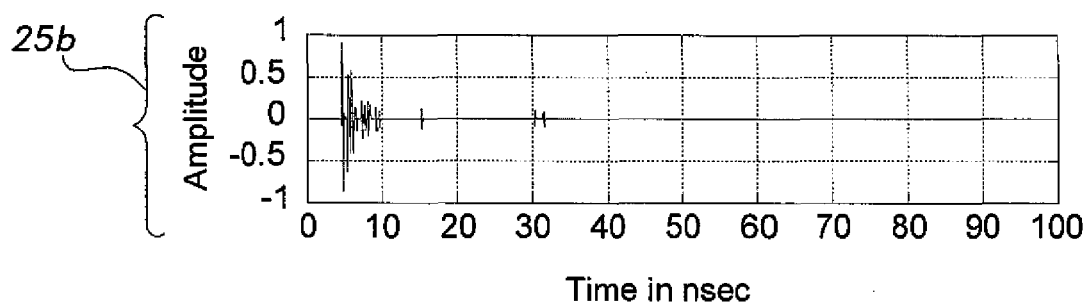
FIG. 25B shows the CS-Reconstructed profile.
Figure 25C:
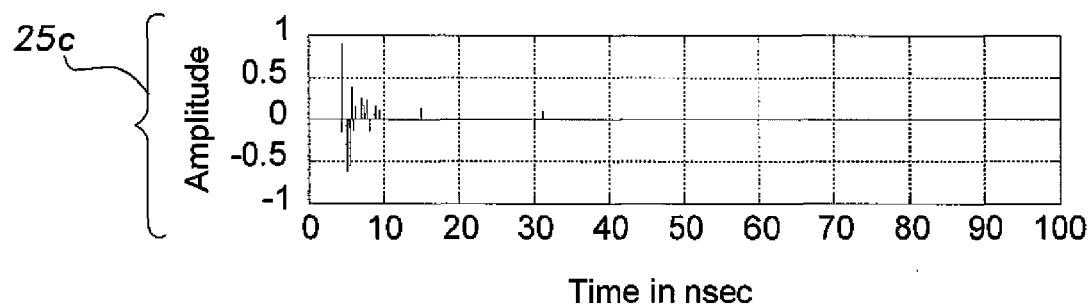
FIG. 25C shows the CS-estimated impulse response for the measured profile of FIG. 25A.

The same holds true for the case of practical profiles. Consider the previously defined boresight dictionary. The sparse vector, $\Theta$, represents the impulse response of the practical channel. FIGS. 25A, 25B and 25C show the reconstructed practical signal using $T_0=20$, and the normalized error is 0.44. The large value for the error is due to the fact that we are comparing with a noisy signal, even if no arrivals are present. A more meaningful comparison is when the signal is compared with the one reconstructed with a large number of profiles.

The CS-estimated impulse response for the practical profile of plot 25a, shown in FIG. 25A, is depicted in plot 25c of FIG. 25C. The CS reconstructed profile is shown in plot 25b of FIG. 25B. The amount of energy captured by 20 paths is 80 percent relative to the energy of the impulse response when 400 paths are considered.

Figure 26:
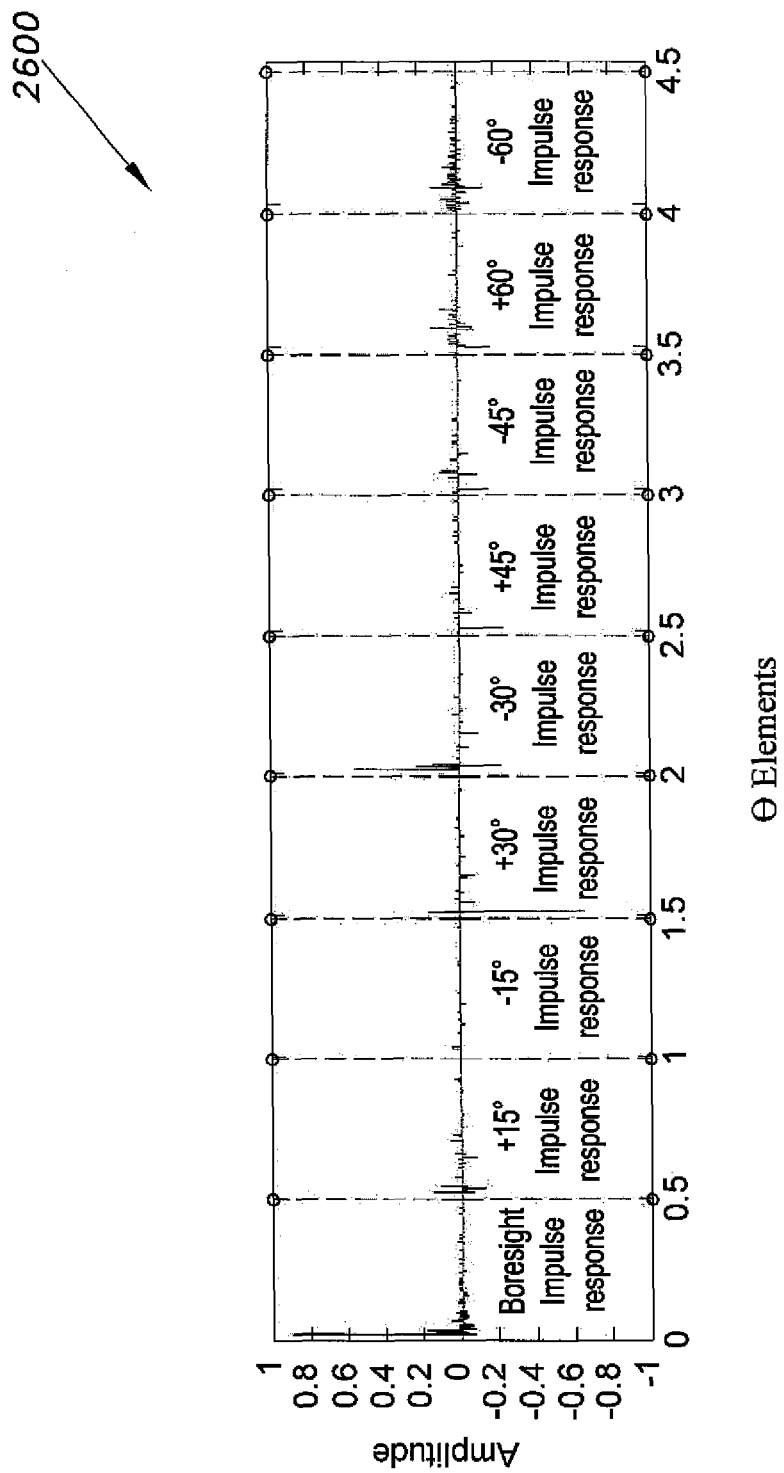
FIG. 26 shows 400 iterations producing sparse vector using a multi-atom dictionary.

Unlike the boresight-based dictionary, the sparse vector of the multi-atom dictionary does not directly represent the impulse response of the channel. Because the multi-atom dictionary consists of sub-dictionaries, the sparse vector, $\Theta$, will also consist of many parts. It starts by the contribution of the first dictionary, followed by the contribution of the second dictionary, and so on. For example, if we use nine sub-dictionaries, the length of the vector, $\Theta$, is nine-fold of the case of one dictionary. Plot 2600 of FIG. 26 shows the sparse vector $\Theta$, of the multi-atom dictionary, where the number of iteration, $T_0$ is 400. The strongest path appears in the boresight dictionary. The $-60°$ dictionary has many small paths as a result of the late arrivals with more pulse dispersion. Therefore, the reconstructed signal is the algebraic sum of the corresponding atoms of the multi-atom dictionary, scaled by the path gains and properly time aligned.

Figure 27:
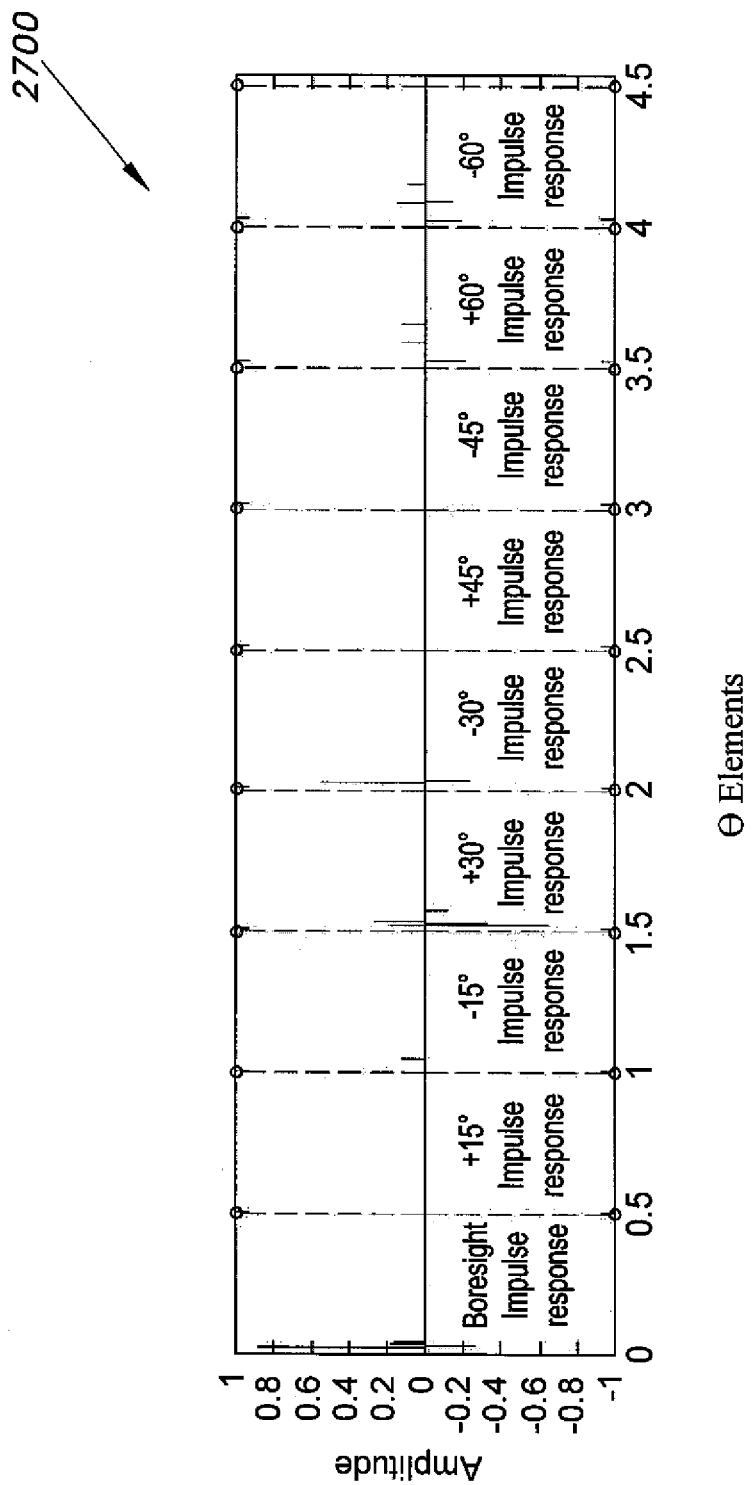
FIG. 27 shows 20 iterations producing sparse vector using a multi-atom dictionary.

To select the strongest 20 paths, we can run the MP algorithm for only 20 iterations. The resultant sparse vector, which captures 86 percent of the energy available, is depicted in FIG. 27.

We have shown that the MP algorithm recovers the strongest paths through the first little iterations. Thus, a large amount of complexity can be reduced, and a great amount of energy can be captured. When using a dictionary with multi-atoms, the corresponding atom of each element in the spars vector has to be well considered.

Figure 28:
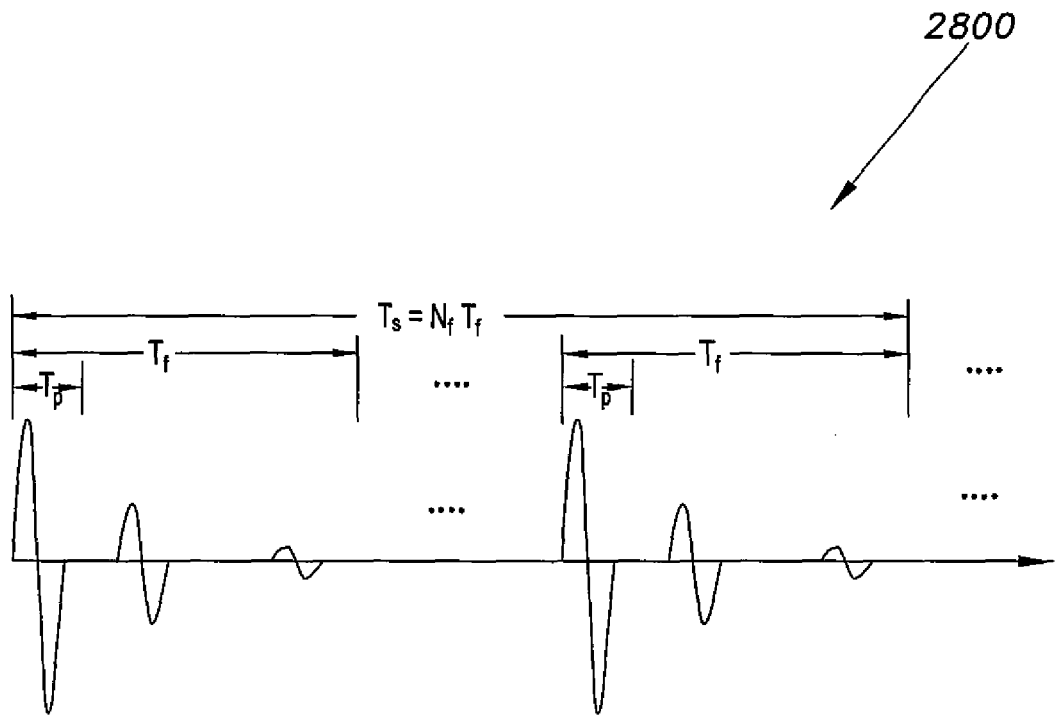
FIG. 28 shows a UWB signal model and symbol time requirements.

Consider a peer-to-peer UWB communication system transmitting k-bit binary information where each bit is represented by $N_f$ ultra-short pulses with a symbol duration of $T_s$. Thus, the transmitted signal can be expressed as:

$$s(t)=\Sigma_k b(k)\Sigma_{j=0}^{N_f-1} p(t-jT_f-kT_s), \quad (23)$$

where $T_f=T_s/N_f$ is the frame time, and each symbol time requires $N_f$ frames, as shown in diagram 2800 of FIG. 28. The amplitude of the pulse stream is modulated by the binary information symbol, $b(k)\in\{-1, +1\}$. Hence, we are employing binary phase modulation. Moreover p(t) is the pulse used to convey information given by equation (2) with a duration of $T_p$. Since we are assuming there is no overlapping, $T_p$ has to be much less than the frame time, i.e., $T_p \ll T_f$ to allow enough time for full decay.

Let the UWB channel be time invariant during $N_s$ symbols, and the path gain and the delay in equation (22) remain constant during $N_s$ symbol durations. In addition, let the maximum delay spread of the multipath channel be denoted by $\tau$. To avoid the inter-pulse-interference between consecutive frames, $T_f$ must be greater than $\tau+T_p$. Therefore, the received UWB frame of the $k^{th}$ transmitted information symbol can be expressed as:

$$r_f = b(k)\cdot p(t-kT_s)*h(t)+\eta(t) \quad (24)$$

$$= b(k)\cdot \sum_{l=0}^{L-1} \alpha_l p(t-kT_s-\tau_l)+\eta(t)$$

where * denotes the convolution operation, and n (t) is the AWG noise with zero mean. The received signal consists of a linear combination of the transmitted pulse, p(t). In order to extend the expression of a received frame in equation (24) to represent one symbol or more during the invariable time of the channel, the noiseless part of $r_f(t)$ in (24) can be periodically repeated every $T_f$ second, leading to:

$$r(t) = \sum_{j=0}^{N_f-1} r_f(t-jT_f)+\eta(t) \quad (25)$$

Beyond signal reconstruction, CS capability can be extended to be an essential part of UWB receivers. For instance, the reconstructed UWB signal via CS can be used as a template in a correlator-based receiver or by means of CS based channel estimation.

Several approaches have been proposed to optimize the signal detection of UWB. Two receivers, the Full Profile-Correlator (FP-Correlator) and the Rake receiver, are commonly used to exploit the multipath diversity of the UWB channel, and are briefly described below.

Figure 13:
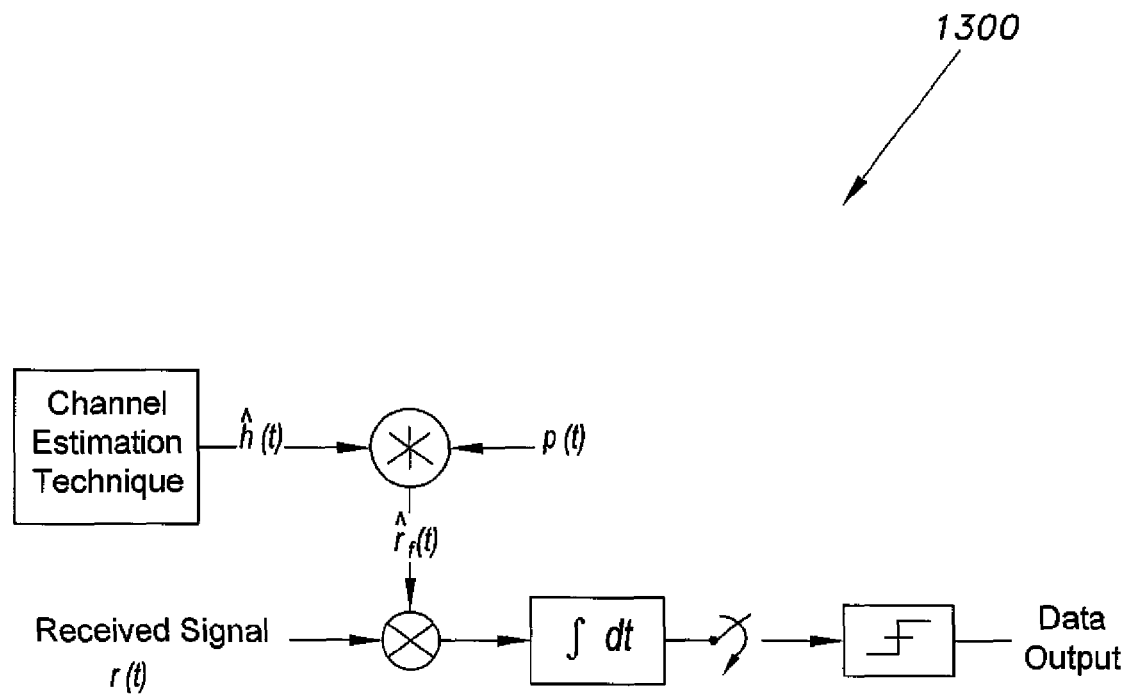
FIG. 13 is a block diagram of an FP correlator according to the prior art.

The FP-Correlator receiver demodulates the information by correlating the UWB received frame, $r_f(t)$ with a pre-estimated frame, $\hat{r}_f(t)$. Therefore, the FP-correlator receiver is designed to have a frame-rate sampling. FIG. 13 shows a block diagram of an FP-correlator receiver 1300.

Figure 16:
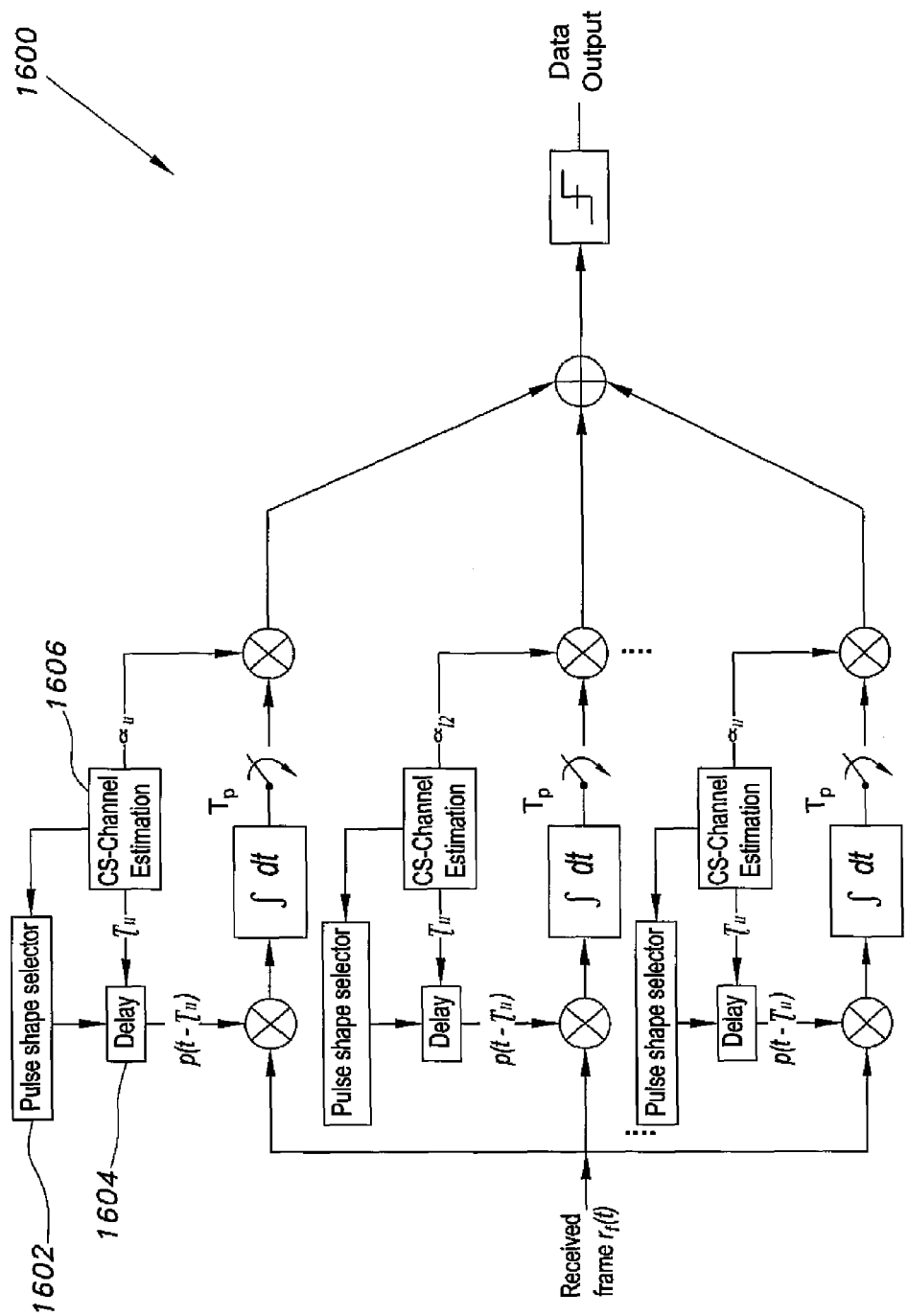
FIG. 16 is a block diagram showing the rake receiver used in a method for compressive sensing, reconstruction, and estimation of ultra-wideband channels according to the present invention.

A Rake receiver, on the other hand, captures the significant amount of the energy found in the multipath components. This process is done by employing a number of fingers, $L_r$, to benefit from multipath diversity energy. Each finger has an adjustable gain and delay. The outputs of the fingers are consequently combined by one of the diversity combining techniques, like the known maximum ratio combining (MRC) technique. Block diagram 1600 of FIG. 16 shows a Rake receiver with fingers.

Channel estimation is necessary in both receivers, either to obtain the reference profile as in the FP-Correlator receiver, or to find the best values to adjust the finger parameters, as in the Rake receiver. The prior art channel estimation approach employs several transmitted symbols to estimate the optimal template in the analog domain, where analog delay units are used to delay and average a symbol-long received signal, leading to symbol-long channel estimation. This averaged symbol is used as a noisy profile reference in the FP-correlator-based receiver in order to demodulate the information at symbol-rate sampling. Likewise, in other prior art techniques the channel estimation is done in an analog domain, but with frame-long training waveforms. Although those approaches do not require high sampling rate, they consume high power in the analog delay part and do not support low data rate at the present time.

Estimating the path gains and the corresponding delays in the digital domain has been done in the prior art. However, to achieve reliable performance, the estimator requires at least 14-16 samples per pulse width, thus demanding a formidable sampling rate in the order of tens of GHz. Consequently, it increases the complexity of the receiver design, especially for a large number of significant paths, as in NLOS cases. Additionally, this leads to the need for more precision and very accurate timing control, which is not suitable for current ADCs.

Figure 14:
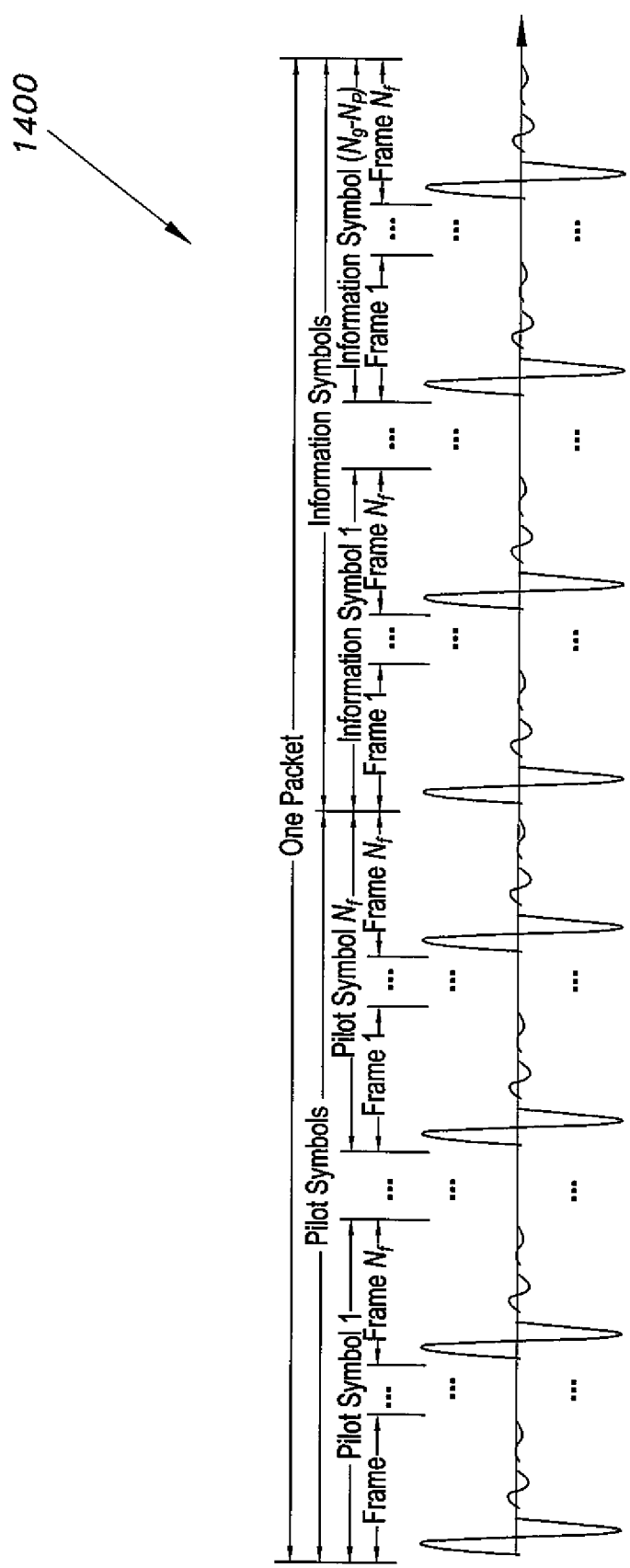
FIG. 14 is a plot showing transmitted packets.

The present method utilizing the present signal model overcomes these limitations. A packet consists of training symbols followed by information symbols. Every symbol is made up of frames, and the frames are made of pulses. See data packet 1400 shown in FIG. 14 for details. Let $N_p$ be the number of training symbols (also called pilot symbols), transmitted at the beginning of the packet. These pilot symbols are randomly projected to provide the measurement vector to the CS algorithm (MP) in order to produce the channel parameters. These parameters are used to generate the impulse response to be employed both in the FP-Correlator, and in the Rake receiver as well. The rest of the symbols in the packet $(N_s\text{-}N_p)$ are information symbols. To distinguish between pilot symbols and the information symbols, we may rewrite the UWB received signal in (25) in a detailed form:

$$r(t) = \sum_{k=0}^{N_w-1} b_p\left(\left\lfloor \frac{k}{N_f} \right\rfloor\right) \sum_{l=1}^{L} \alpha_l p(t - kT_f - \tau_l) + \eta(t) \quad (26)$$

for $0 < t \le T_w$ and $$r(t) = \sum_{k=N_w}^{(N-N_p)N_f-1} b_i\left(\left\lfloor \frac{k}{N_f} \right\rfloor\right) \sum_{l=1}^{L} \alpha_l p(t - kT_f - T_w - \tau_l) + \eta(t) \quad (27)$$

for $T_w < t \le N_s N_f T_f$ where $b_p$ and $b_i$ are the pilot and the information symbol, respectively; $N_w$ represents the total number of pilot frames, i.e., $N_w = N_p N_f$; and $T_w$ is the time duration of the pilot waveforms. Clearly, equation (26) represents the training symbols, while equation (27) represents the information symbols. Thus, the number of waveforms used in channel estimation is $N_p N_f$ within $T_w$ seconds.

Although, as known in the art, MP detection does not require perfect coherence, in this research the simulation is built on the assumption of perfect time synchronization, and there is no overlapping between consecutive frames, i.e., $kT_f \le t \le (k+1)T_f$ for $k=0, 1, \ldots, N_{fc}-1$. This leads to a representation of a received pilot waveform in a frame time as:

$$r_k(t) = b_p\left(\left\lfloor \frac{k}{N_f} \right\rfloor\right) \sum_{l=1}^{L} \alpha_l p(t - kT_f - \tau_l) + \eta(t). \quad (28)$$

Upon this model of a UWB signal, next we represent two UWB receivers that employ CS to estimate the channel and, in turn, demodulate the information. According to the prior art, the optimum template to be used in the detection stage in UWB receiver is the received signal itself, given by equation (18). Recall that the actual received UWB signal consists of shifted and scaled versions of the transmitted pulse. The estimated profile is contaminated by AWG noise. Consequently, if we take random measurements from the received profile and pass them to the MP algorithm, the reconstructed profile will be a noisy profile. Since we use $N_w$ waveforms to estimate the reference profile, it is computationally expensive to run the MP algorithm $N_w$ times. Instead, we can take the random measurements after averaging the $N_w$ pilot waveforms, leading to executing the MP algorithm once every channel estimation period. Hence, the result is less computation efforts and more mitigation of AWG noise.

Briefly, in the CS-FP-Correlator receiver, the reference template is obtained by receiving $N_w$ waveforms, averaging them, taking random projected samples, and passing them to the MP algorithm to reconstruct the reference template.

Figure 15:
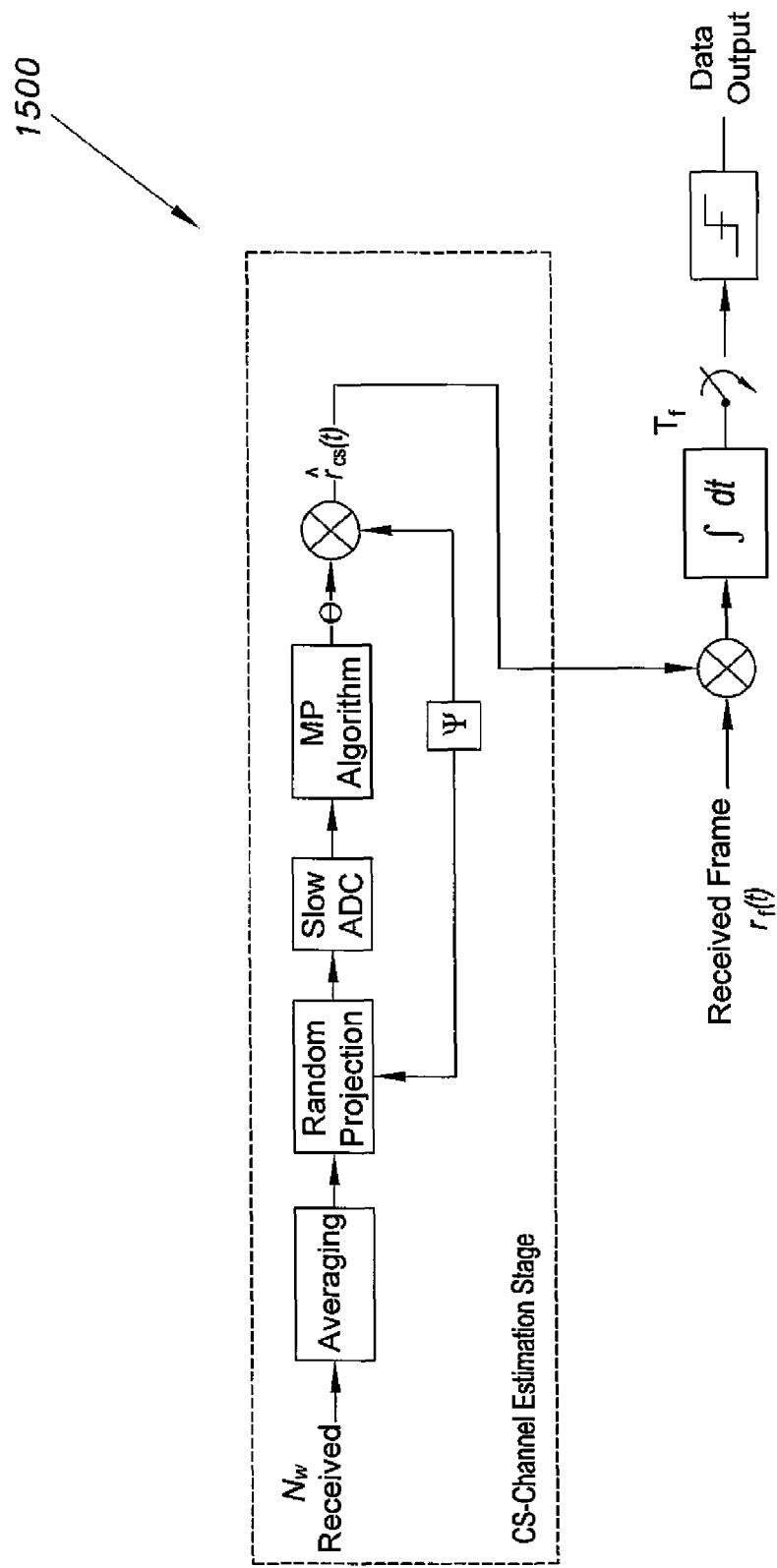
FIG. 15 is a block diagram showing a CS FP correlator used in a method for compressive sensing, reconstruction, and estimation of ultra-wideband channels according to the present invention.

Since the MP algorithm uses the dictionary to reconstruct the UWB signal, the denoising operation is performed implicitly, where the dictionary is composed of atoms that are matched to the transmitted signal and are noise-free. However, a new type of error may appear in the received pilot signal due to the spurious atoms that are wrongly identified as a consequence of the AWG noise. The noise component in the projected signal may drive the MP algorithm to introduce redundant atoms in the reconstructed signal that do not exist in the original noiseless signal. In order to minimize the number of the spurious atoms in the template, the AWG noise is alleviated by increasing the number of pilot waveforms, $N_w$. Alternatively, we can threshold (cutoff) the averaged signal under the noise level before taking the random projection. This will cause a reduction in the matching processes in the MP algorithm, whereby the weak arrivals will be clipped. The channel is estimated by averaging the received pilot signals as the following:

$$r_p(t) = \frac{1}{N_w} \sum_{k=0}^{N_w-1} r_k(t) \quad (29)$$

where $r_p(t)$ is the averaged pilot signal, and $r_k(t)$ is the received pilot waveforms defined by equation (26). The averaged pilot signal is randomly projected to produce the estimated channel. The reference profile, $\hat{r}_{CS}(t)$ is used as a template in the detection stage to demodulate the transmitted symbols. The major difference between the normal channel estimation approach in the prior art and the present CS approach is that the CS-FP-Correlator performs template reconstruction from the random projected signal, which has been sampled at a significantly reduced rate. As soon as the referenced template is estimated, it is used in the detection stage of the receiver, before the decision stage. Since $N_f$ frames represent one symbol, the decision is statistically taken for the $k^{th}$ symbol by adding up the correlator output related to the information symbol as:

$$z(k) = \sum_{j=0}^{N_f-1} \int_{jT_f+kT_f}^{(j+1)T_f+kT_f} r(t)\hat{r}_{CS}(t - jT_f - kT_s)dt \quad (30)$$

where $\hat{r}_{CS}(t)$ is the reference frame estimated via MP, and the correlation between the UWB received signal and the template is done inside the integration. An illustrative block diagram of a CS-FP-Correlator 1500 is shown in FIG. 15 and depicts the CS-channel estimation stage.

Full profile correlation is costly. It is more practical to correlate with individual path arrivals. The idea behind Rake receivers is to exploit the energy available in the multipath. The decision does not depend only on the first or the strongest arrival.

Due to the extremely narrow pulse duration, UWB channels have a lot of significant resolvable multipath components. Hence, it is natural to use a Rake receiver for UWB channels. Next, we evaluate the performance of MP algorithm channel estimation for a Rake receiver when practical channels are considered. For example, a pilot signal model is defined in equation (28), and where k indicates the current pilot signal for k=1, 2, ..., $N_w$, where $\alpha_l$ and $\tau_l$ are the channel taps to be estimated. Since we employ $N_w$, as in the FP-Correlator receiver, a wrong estimation might occur due to the noise component in the received pilot signals. It will cause the MP algorithm to add mistaken atoms in the recovered pilot signal, and hence increases the error in the channel estimation. To alleviate the effect of AWG noise, we can take the measurements out of the averaged received pilot profiles and use them in the MP algorithm to estimate the channel parameters. Hence, by means of CS we can estimate the channel using the random projections of the pilot signals, leading to a reduction in the computational cost and alleviating the noise effect. Although the advantage of the Rake receiver is to collect the energy distributed in different paths, the complexity of the Rake receiver is proportional to the number of its fingers. Usually, the first few paths in UWB channels have the greatest amount of energy. We restrict the significant number of paths to $L_c$ to end up with channel parameters of $\{\hat{\alpha}_l, \hat{\tau}_l\}_{l=1}^{L_c}$. The resultant vector of MP is the estimated delays and path gains related to the strongest propagation paths. These parameters are then used to adjust the tap delay and the gain in Rake's finger. The CS Rake based receiver (CS-Rake) feeds the received information signal, given by (25), to the $L_c$ fingers, each finger has a correlator supplied by a template of the transmitted pulse, scaled by $\hat{\alpha}_l$, and delayed by $\hat{\tau}_l$, i.e., $\hat{\alpha}_l p(t-\hat{\tau}_l)$. The outputs of these correlators represent the energy available in the selected paths to be combined by maximum ratio combining (MRC). The resultant output is used to detect the $k^{th}$ information bit that was transmitted during the frame. The output of the MRC can be expressed mathematically as:

$$z_r(k, j) = \sum_l^{L_c} \hat{\alpha}_l \int_{kT_s+jT_f+\hat{\tau}_l}^{kT_s+jT_f+\hat{\tau}_l+T_p} r(t)p(t-kT_s+jT_f+\hat{\tau}_l)dt \quad (31)$$

As in the right hand side of equation (29), correlation is employed to capture the signal energy by matching the template to delayed versions.

For the case when the multi-atom dictionary is used, another configuration has to be considered. The resultant sparse vector, $\Theta$, provides three channel parameters (rather than two), the gain $\hat{\alpha}$, the delay $\hat{\tau}$, and an index of the corresponding pulse shape. The CS-Rake receiver 1600 is shown in FIG. 16. The pulse-shape-selector block 1602 utilizes the pulse index received from the channel estimator 1606 to provide the appropriate pulse shape formed by the delay block 1604.

Since we are using $N_f$ frames per symbol to convey information, the decision is statically made according to the summation of the MRC outputs for $N_f$ consecutive frames. The estimated bit of the $k^{th}$ information symbol is given as:

$$\hat{b}(k) = \begin{cases} 1 & \text{if } \sum_{j=0}^{N_f-1} z_r(k, j) > 0 \\ -1 & \text{if } \sum_{j=0}^{N_f-1} z_r(k, j) \leq 0 \end{cases} \quad (32)$$

Practically, the number of fingers is a design parameter, and it is usually chosen as a tradeoff between the complexity of the design and the performance of the receiver. Since the energy is concentrated in the strongest paths, the number of fingers in our approach is restricted by the number of the significant paths in the UWB channel, i.e., $L_c$. Like the CS-FP-correlator, the complexity in this receiver is mainly in the channel estimation stage. Particularly, it depends on the number of iterations in the MP algorithm. If we consider the maximum number of iteration, the complexity of the MP algorithm is approximated to be on the order of $C L_c T_0$, i.e., $O(C L_c T_0)$, where $T_0$ is the number of MP iterations and C is a constant that depends on the dictionary size. However, we do not need to run MP for $T_0$ iterations. To find the strongest paths, the number of iterations has to be equal to the number of Rake's fingers. The complexity of UWB channel estimation via CS increases linearly with the number of Rake fingers.

Having described CS-channel estimation techniques, simulation results are presented to show the level of reliability of CS in practical UWB signal detection. The IEEE 802.15.4a channel model is involved for comparison purposes. The directional channel model of UWB well simulates the measured profiles. Thus, the noiseless practical profiles will be generated by the directional model.

The performance of the present dictionaries is examined for the CS-FP-Correlator and the CS-Rake receivers. The first derivative of the Gaussian pulse was selected as the transmitted pulse waveform, p(t), that has been normalized to have unit energy and a pulse duration of 0.34. All dictionary atoms likewise have unit energy.

The transmitted information was modulated using binary PAM, where the information bits, b(k), are independent binary symbols of equal probability. Moreover, the frame time parameter in equations (30) and (31) are set to $T_f$=100 ns to guarantee no overlapping between consecutive frames. The number of symbols that are used to estimate the channel is $N_f$=25. All IEEE based profiles and Gaussian reference pulses were sampled before the projection stage at a rate of 50 GHz, which is higher than the Nyquist rate, meaning that the continuous time signals are simulated with a time resolution of 20 ps. The channel taps are normalized to unit energy for fair comparison.

The performance of our approach is evaluated over 200 channel realizations. For each channel realization, 10,000 symbols are transmitted. Out of these transmitted symbol symbols, $N_p$=2 symbols are used to estimate the channel parameters. Each pilot symbol is randomly projected and sampled by a low rate ADC. The output pilot projections are averaged by $N_p$ and passed to the MP algorithm to produce the estimated channel response using one of the previously defined dictionaries. The remaining information symbols, 10,000-$N_p$, are then demodulated by the estimated channel response. Eventually, we average out the 200 BER readings obtained to determine the BER for the considered channel. The evaluation criterion is the average bit error rate as a function of the SNR.

The termination criterion of the MP algorithm is set as previously explained. The maximum number of MP iterations in the CS-FP-Correlator is set to 400 iterations, and the target residual energy is set to 1.3 percent of the energy left in the average of the projected pilot signals. Since the CS-Rake rake receiver only utilizes a few paths (the strongest ones), it requires fewer iterations to recover the first, strongest paths. The MP algorithm is reset to produce the sparse vector, $\Theta$, after 30 iterations. The MP algorithm is executed once per channel estimation period for both the CS-FP-Correlator and CS-Rake receivers.

Figure 17:
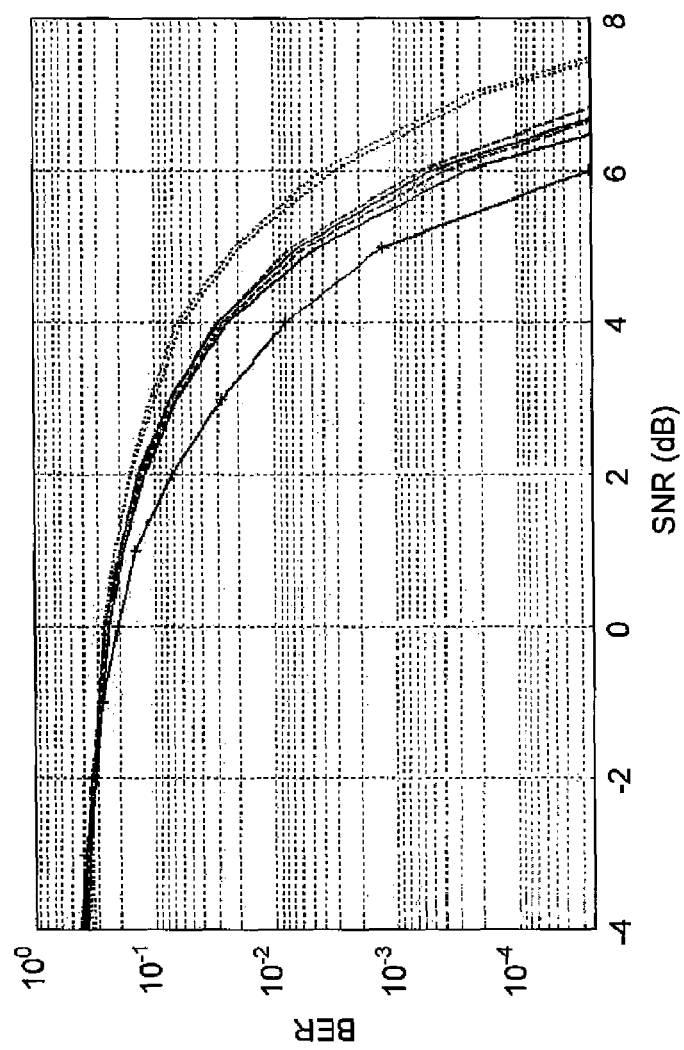
FIG. 17 is a plot showing performance of the proposed dictionaries in a method for compressive sensing, reconstruction, and estimation of ultra-wideband channels according to the present invention.

Plot 1700 of FIG. 17 depicts the BER performance of the present directional dictionaries. The IEEE profiles were generated for an indoor residential environment with LOS propagation (CM1). The sampling frequency has been reduced to 30% of the original sampling frequency to be 15 GHz. The number of fingers for CS-Rake is set to 30 fingers. Two pilot symbols are used for channel estimation.

As plot 1700 shows, the performance of the CS-FP-Correlator is optimum for the IEEE channel model. The CS-Rake has a fewer number of MP iterations, in contrast to the CS-FP-Correlator. However, its performance is very close to the CS-FP-Correlator. The practical channel resulted in about 2 dB degradation in the BER performance, as can be seen when comparing the performance of the CS-FP-Correlator over the IEEE channel with its performance over a practical channel. About 1 dB can be recovered by using the multi-atom dictionary at the cost of added complexity.

Although it has less complexity in contrast to the multi-atom dictionary, the strongest atom dictionary has very comparable performance. The strongest atoms dictionary is a trade-off between the relatively-low performance of the boresight dictionary and the complexity of the multi-atom one.

Employing the present dictionaries in UWB channel estimation results in improvement. Two receivers were implemented. The major difference between the CS-FP-Correlator receiver and the Rake receiver is the number of iterations required. The CS-Rake concentrates on only the strongest paths, and makes use of their energy in the detection stage. The CS-FP-Correlator requires more iterations.

The practical channel resulted in about 2 dB degradation in the BER performance, in contrast to the IEEE channel model. About 1 dB can be recovered by using the multi-atom dictionary at the cost of added complexity. The strongest atoms dictionary is a trade-off between the relatively-low performance of the boresight dictionary and the complexity of the multi-atom one.

It will be understood that the diagrams in the Figures depicting the method for compressive sensing, reconstruction and estimation of ultra-wideband channels are exemplary only, and may be embodied in a dedicated electronic device having a microprocessor, microcontroller, digital signal processor, application specific integrated circuit, field programmable gate array, any combination of the aforementioned devices, or other device that combines the functionality of the method for compressive sensing, reconstruction and estimation of ultra-wideband channels onto a single chip or multiple chips programmed to carry out the method steps described herein, or may be embodied in a general purpose computer having the appropriate peripherals attached thereto and software stored on a non-transitory computer readable media that can be loaded into main memory and executed by a processing unit to carry out the functionality of the steps of the method described herein.

It is to be understood that the present invention is not limited to the embodiments described above, but encompasses any and all embodiments within the scope of the following claims.

We claim:

1. A method for compressive sensing (CS), reconstruction and estimation of ultra-wideband channels of a UWB transmission, comprising the steps of:

building an IR-UWB channel dictionary matrix related to antenna angles of transmission and antenna angles of arrival associated with an IR-UWB signal transmitted over the IR-UWB channel;

using the IR-UWB channel dictionary matrix in conjunction with a measurement basis to perform an action selected from the action groups consisting of reconstructing the IR-UWB signal and estimating the channel of the IR-UWB signal;

when the action group performed is the IR-UWB reconstruction, the step of using the IR-UWB channel dictionary matrix includes the steps of:

(a) combining a measurement matrix $\Phi$ with the channel dictionary matrix $\Psi$;

(b) measuring the IR-UWB signal using the measurement and channel dictionary matrix combination, thereby producing an output stream of signal measurements;

(c) executing a CS algorithm on the signal measurements using the measurement and channel dictionary matrix combination, the CS algorithm producing a CS algorithm output; and (d) combining the CS algorithm output with the channel dictionary matrix, thereby reconstructing the IR-UWB signal.

2. The method for compressive sensing, reconstruction and estimation of ultra-wideband channels according to claim 1, wherein said CS algorithm is a matching pursuit (MP) algorithm.

3. The method for compressive sensing, reconstruction and estimation of ultra-wideband channels according to claim 2, wherein said MP algorithm has a number of iterations termination criterion, the method further comprising the step of setting the number of iterations termination criterion of said MP algorithm such that a residual ratio=$\|e_r\|_2/\|y\|_2$ is restricted to approximately 0.013, whereby the number of iterations is approximately 400.

4. The method for compressive sensing, reconstruction and estimation of ultra-wideband channels according to claim 2, further comprising the step of using time-domain measured profiles of the UWB transmitted signal obtained from a predetermined antenna as an input to building said channel dictionary matrix $\Psi$.

5. The method for compressive sensing, reconstruction and estimation of ultra-wideband channels according to claim 4, further comprising the steps of:

creating directional profiles utilizing an antenna model having a directional impulse response characterized by the relation:

$$(t,\theta,\phi) = \Sigma_{l=0}^{L-1} \Sigma_{k=0}^{K-1} (t - T_l - \tau_{k,l}) \delta(\theta - \Theta_l - \omega_{k,l}) \delta(\phi - \Phi_l - \nu_{k,l}),$$

where $\Theta$ is the cluster vertical (elevation) angle with uniform distribution on $[0, \pi)$, $\omega$ is the ray vertical angle with zero mean of Laplacian distribution, $\Phi$ is the cluster horizontal (azimuth) angle with uniform distribution on $[0, 2\pi)$, and $\nu$ is the ray horizontal angle with zero-mean Laplacian distribution; and using the antenna model to generate waveforms at receiver elevation angle steps of 0°, 15°, 30°, 45°, and 60°.

6. The method for compressive sensing, reconstruction and estimation of ultra-wideband channels according to claim 5, further comprising the step of generating atoms of said IR-UWB channel dictionary matrix to create a practical dictionary based on a boresight signal, wherein each atom of the practical dictionary is a shifted version of a practical IR-UWB pulse characterized by the relation:

$$\psi_j = p_0(t - j\Delta) \quad j = 0, 1, 2, \ldots \left\lfloor \frac{N - l_0}{\Delta} \right\rfloor,$$

where $p_0$ is the practical pulse received at zero degrees and $l_0$ is the length of the practical pulse received at zero degrees.

7. The method for compressive sensing, reconstruction and estimation of ultra-wideband channels according to claim 5, further comprising the steps of:

generating atoms of said IR-UWB channel dictionary matrix to create a dictionary having variable width atoms, including assigning in said dictionary wider pulse width values corresponding to later arrival pulses associated with increasing relative antenna angles, wherein the pulse duration of the first atom is set to be equal to the live practical boresight duration and zero shift, subsequent atoms having a gradual increase in duration and delay, a last of the atoms having a duration matching the duration of a practical waveform corresponding to a maximum measured reception angle of the antenna, atoms of the variable width dictionary being characterized by the relation:

$$\psi_j = p(\sigma_j t - j\Delta) \, j = 0, 1, 2, \ldots,$$

where $\sigma_j$ is a parameter controlling the increment of the pulse duration in each of the atoms and the maximum value of j is controlled by the length of the received signal; and stopping the generation of atoms when shifting exceeds the signal length.

8. The method for compressive sensing, reconstruction and estimation of ultra-wideband channels according to claim 5, further comprising the step of:

generating atoms of said IR-UWB channel dictionary matrix to create a multi-atom directional dictionary, wherein each atom of the multi-atom directional dictionary is characterized by the relation:

$$\psi i_j = p_i(t - j\Delta) \quad i = 1, 2, \ldots 9; \, j = 0, 1, 2, \ldots \left\lfloor \frac{N - l_i}{\Delta} \right\rfloor,$$

where the first subscript, i, indicates the directional reference number, the second subscript, j, indicates the amount of shift $p_i(.)$ as being the $i^{th}$ directional reference, $\Delta$ is the minimum step shift, and $l_i$ is the length of the $i^{th}$ directional reference, the multi-atom directional dictionary further being characterized by the relation:

$$\Psi = [\psi_{1_0}(t), \ldots, \psi_{1_{n-l_1}}(t), \psi_{2_0}(t) \ldots, \psi_{9_{n-l_9}}(t)].$$

there being 9 directional references.

9. The method for compressive sensing, reconstruction and estimation of ultra-wideband channels according to claim 8, further comprising the step of generating atoms of said IR-UWB channel dictionary matrix to create a strongest atoms directional dictionary, wherein the strongest atoms directional dictionary is built from the strongest contributed references found in the multi-atom directional dictionary.

10. The method for compressive sensing, reconstruction and estimation of ultra-wideband channels according to claim 9, wherein said strongest contributed references are atomic references associated with 0° and 60°, respectively.

11. The method for compressive sensing, reconstruction and estimation of ultra-wideband channels according to claim 2, further comprising the step of incorporating channel estimation into a compressive sensing full-profile correlator receiver.

12. The method for compressive sensing, reconstruction and estimation of ultra-wideband channels according to claim 11, further comprising the step of reducing the number of multipath propagation components needing to be estimated by not estimating multipath propagation components in the transmitted IR-UWB signal containing negligible energy.

13. The method for compressive sensing, reconstruction and estimation of ultra-wideband channels according to claim 12, further comprising the step of performing channel estimation with an FP-correlator to estimate a reference template, the channel estimation being characterized by the relation:

$$r_p(t) = \frac{1}{N_w} \sum_{k=0}^{N_w - 1} r_k(t)$$

where $r_p(t)$ is the averaged pilot signal, and $r_k(t)$ is the received pilot waveforms defined by equation:

$$r_k(t) = b_p\left(\left\lfloor \frac{k}{N_f} \right\rfloor\right) \sum_{l=1}^{L} \alpha_l p(t - kT_f - \tau_l) + \eta(t).$$

14. The method for compressive sensing, reconstruction and estimation of ultra-wideband channels according to claim 13, further comprising the step of performing an integration using said reference template to detect symbols transmitted by the IR-UWB signal, the integration being characterized by the relation:

$$z(k) = \sum_{j=0}^{N_f - 1} \int_{jT_f + kT_f}^{(j+1)T_f + kT_f} r(t) \hat{r}_{CS}(t - jT_f - kT_s) dt,$$

where $\hat{r}_{CS}(t)$ is the reference frame estimated via MP, and the correlation between the UWB received signal and the template is done inside the integration.

15. The method for compressive sensing, reconstruction and estimation of ultra-wideband channels according to claim 2, further comprising the step of incorporating channel estimation into a compressive sensing rake receiver.

16. The method for compressive sensing, reconstruction and estimation of ultra-wideband channels according to claim 15, further comprising the step of using random projections of pilot signals transmitted by the IR-UWB transmitted signal to perform channel estimation, thereby reducing computation and alleviating specious noise in the signal.

17. The method for compressive sensing, reconstruction and estimation of ultra-wideband channels according to claim 16, further comprising the steps of:

restricting a number of paths to $L_c$ to end up with channel parameters of $\{\hat{\alpha}_l, \hat{\tau}_l\}_{l=1}^{L_c}$;

using an MP vector containing estimated delays and path gains resulting from the path restriction to adjust tap delay and gain in fingers of said rake receiver;

associating a correlator with each of the fingers of said rake receiver, each of the fingers being supplied by a template of a transmitted pulse of said IR-UWB signal, said transmitted pulse template being scaled by $\hat{\alpha}_l$ and delayed by $\hat{\tau}_l$, $\hat{\alpha}_l p(t - \hat{\tau}_l)$, outputs of said correlators representing energy available in the paths selected for estimation to be combined by maximum ration combining;

using said correlator outputs to detect a $k^{th}$ information bit transmitted during a frame of said IR-UWB transmitted signal, the MRC output being characterized by the relation:

$$z_r(k, j) = \sum_{l}^{L_c} \hat{\alpha}_l \int_{kT_s+jT_f+\hat{\tau}_l}^{kT_s+jT_f+\hat{\tau}_l+T_p} r(t)p(t - kT_s + jT_f + \hat{\tau}_l)dt.$$

18. The method for compressive sensing, reconstruction and estimation of ultra-wideband channels according to claim 17, further comprising the steps of:

using a pulse index received from channel estimation to select an appropriate pulse shape when a multi-atom dictionary is used;

estimating bits of the $k^{th}$ information symbol by performing a decision computation characterized by the relation:

$$\hat{b}(k) = \begin{cases} 1 & \text{if } \sum_{j=0}^{N_f-1} z_r(k, j) > 0 \\ -1 & \text{if } \sum_{j=0}^{N_f-1} z_r(k, j) \leq 0. \end{cases}$$

* * * * *